United States Patent
Barman et al.

(10) Patent No.: US 6,915,008 B2
(45) Date of Patent: Jul. 5, 2005

(54) METHOD AND APPARATUS FOR MULTI-NODAL, THREE-DIMENSIONAL IMAGING

(75) Inventors: Rod Barman, Vancouver (CA);
Malcolm Steenburgh, Vancouver (CA);
Don Murray, Vancouver (CA); Shyan Ku, Vancouver (CA)

(73) Assignee: Point Grey Research Inc., Vancouver (CA)

( * ) Notice: Subject to any disclaimer, the term of this patent is extended or adjusted under 35 U.S.C. 154(b) by 641 days.

(21) Appl. No.: 10/092,879

(22) Filed: Mar. 8, 2002

(65) Prior Publication Data

US 2002/0167726 A1 Nov. 14, 2002

Related U.S. Application Data

(60) Provisional application No. 60/273,830, filed on Mar. 8, 2001.

(51) Int. Cl.[7] .................................................. G06K 9/00
(52) U.S. Cl. ....................... 382/154; 382/100; 382/151; 348/47; 345/419; 356/12; 396/325
(58) Field of Search ................................. 382/100, 151, 382/153, 154; 348/42, 47, 48; 345/419–427; 356/12, 15, 611; 396/324, 325, 331–333

(56) References Cited

U.S. PATENT DOCUMENTS

| | | | |
|---|---|---|---|
| 5,531,520 A | * 7/1996 | Grimson et al. | 382/131 |
| 5,606,627 A | * 2/1997 | Kuo | 382/154 |
| 6,377,701 B1 | * 4/2002 | Ohki | 382/154 |
| 6,754,379 B2 | * 6/2004 | Xiong et al. | 382/154 |

* cited by examiner

Primary Examiner—Samir Ahmed
Assistant Examiner—Anand Bhatnagar
(74) Attorney, Agent, or Firm—Oyen Wiggs Green & Mutala

(57) ABSTRACT

A system for localizing objects has two or more measurement units. Calibration methods provide transformations to a common reference frame by locating calibration features in local reference frames of the measurement units. A calibration target spanning measurement fields of the measurement units may be used. The measurement units may have overlapping measurement fields. The measurement units may comprise stereo vision units or other units capable of locating objects or object features.

55 Claims, 14 Drawing Sheets

METHOD AND APPARATUS FOR MULTI-NODAL, THREE-DIMENSIONAL IMAGING

CROSS REFERENCE TO RELATED APPLICATION

The benefit of the filing date of U.S. application Ser. No. 60/273,830 filed 8 Mar. 2001, which is incorporated herein by reference, is claimed herein.

TECHNICAL FIELD

This invention relates to the field of machine vision and, more generally, to determining the positions of objects or features in three-dimensional space. The invention provides methods and apparatus for determining positional information for objects. In particular, the invention relates to determining relationships between local frames of reference for multiple measurement units.

BACKGROUND

A three-dimensional position-sensing device can determine the three-dimensional locations of objects within a limited field of view. One example of such a device is the DIGICLOPS™ stereo vision system available from Point Grey Research of Vancouver, Canada. Such systems are used in a wide variety of applications, such as computer vision systems, tracking applications, object dimensioning applications and others.

A typical stereo vision camera system comprises two spaced-apart digital cameras. Some prior art stereo vision camera systems have three cameras. FIG. 1 shows a two-camera vision system 1 having two cameras 11A and 11B. The distance b between cameras 11A and 11B is referred to as the "baseline". Each of cameras 11A and 11B has an associated optical axis 16A and 16B and a field of view 12A and 12B. These fields of view 12A and 12B overlap one another in region 13, which is referred to as the "stereo measurement field".

The position in a local three-dimensional coordinate system of a point on an object in the stereo measurement field can be determined by triangulation. This may be done by locating the point in images from each of cameras 11A and 11B. The position of the point is related to the (u, v) positions at which the point appears in the two images by a function as follows:

$$\vec{p}(x, y, z) = F(u_1, v_1, u_2, v_2) \qquad (1)$$

where $(u_1, v_1)$ is the position of the image of the point in the image obtained by camera 11A; $(u_2, v_2)$ is the position of the image of the point in the image obtained by camera 11B and (x, y, z) is the location of the point in the reference frame of stereo measurement unit 10. The function F depends upon the distance b, the optical characteristics of cameras 11A and 11B, and the spacing between light-sensing elements in cameras 11A and 11B. Stereo measurement unit 10 may be calibrated (i.e. the function F can be determined) in any suitable manner including by using any of a number of prior art techniques mown to those skilled in the art. The coordinate system (x, y, z) is local to vision system 1. If system 1 is moved relative to an object then the apparent position of the object in coordinate system (x, y, z) will change.

System 1 includes a processor 14 which receives images from each of cameras 11A and 11B, performs feature extraction to identify corresponding points in each of the images and uses the known function F to determine the locations of the corresponding points in the (x, y, z) coordinate system of stereo measurement unit 10. Since the three-dimensional imaging system 1 employs triangulation techniques, if cameras 11A and 11B remain fixed relative to one another, calibration will be preserved. Movements of cameras 11A and 11B or changes in baseline b can cause spurious measurement results.

The size of stereo measurement field 13 and the three-dimensional imaging resolution of stereo measurement unit 10, may be improved to some degree by one or more of:

changing fields of view 12A and 12B of cameras 11A and 11B;

increasing the resolution of cameras 11A and 11B; and, changing the baseline b.

However, each of these techniques has limitations.

Changing the field of view of cameras 11A and/or 11B may increase the size of stereo measurement field 13 and improve the measurement accuracy of stereo measurement unit 10 for a particular range of distances, but such a change simultaneously decreases the measurement accuracy at other distances. For example, widening the field of view of camera 11A increases the size of stereo measurement field 13 and improves the measurement accuracy of stereo measurement unit 10 for close objects, but decreases accuracy for objects that are farther away.

Increasing imaging resolution of cameras 11A and 11B improves the three-dimensional imaging resolution of stereo measurement unit 10, but increases the amount of data to be processed and decreases system speed.

In prior art systems like system 1, there is a trade-off between the size and location of stereo measurement field 13 and the accuracy with which three-dimensional positions can be determined. Increasing baseline b (i.e. moving cameras 11A and 11B farther apart) increases the accuracy of tree-dimensional measurements made using stereo measurement unit 10. However, increasing the length of baseline b causes the location of overlap between the limited fields of view (12A and 12B) of cameras 11A and 11B to move to a region further away from stereo measurement unit 10. This eliminates the ability to determine the locations of closer objects.

Increasing the length of baseline b may also lead to system calibration difficulties. If cameras 11A and 11B are too far apart, it becomes more difficult to keep cameras 11A and 11B from moving in relation to one another. Increasing baseline b also increases the overall size of stereo measurement unit 10.

There is a need for improved apparatus and methods for determining the locations of objects.

SUMMARY OF THE INVENTION

The invention relates to methods and apparatus for implementing multi-nodal, three-dimensional imaging systems.

One aspect of the invention provides methods for calibrating three-dimensional imaging systems which include first and second stereo measurement units. The first stereo measurement unit collects information from which the locations of object features within a first stereo measurement field can be determined in a first local coordinate system. The second stereo measurement unit collects information from which the locations of object features within a second stereo measurement field can be determined in a second local coordinate system. In some embodiments, the first and second stereo measurement fields overlap one another in an overlap region.

The calibration methods include methods which determine locations of a plurality of calibration features in both the first and second local coordinate systems. Using the locations of the plurality of calibration features, the methods derive a set of one or more transformations between the local coordinate systems and a common coordinate system. The set of one or more transformations way be used to express locations of object features found in either of the stereo measurement fields in the common coordinate system.

The common coordinate system maybe the same as one of the local coordinate systems.

In some embodiments, the first and second measurement fields overlap within an overlap region and the plurality of calibration features is located in the overlap region. In some embodiments, the plurality of calibration features is located in the measurement field of one of the measurement units and has a known spatial relationship to another plurality of calibration features located in the measurement field of another one of the measurement units.

Other aspects of the invention provide other methods, apparatus and computer program products.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides position measuring systems, which combine the measurement fields of two or more measurement units to provide a larger combined measurement field. The positions of reference points in the combined measurement field may be expressed relative to a common reference frame. The invention also provides methods for calibrating such systems.

Figure 1:
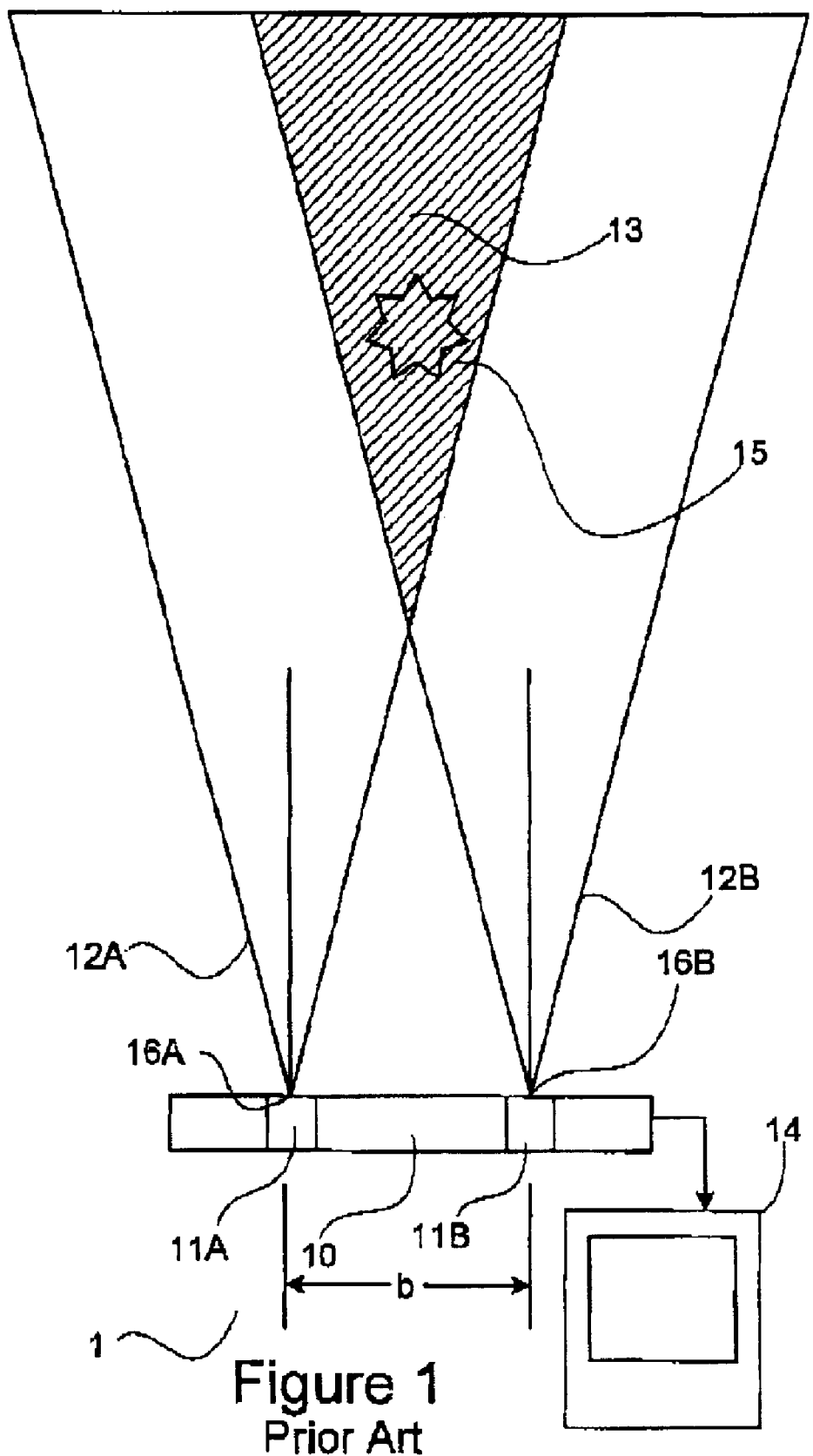
FIG. 1 is a schematic representation of a prior art three-dimensional imaging system.
Figure 2:
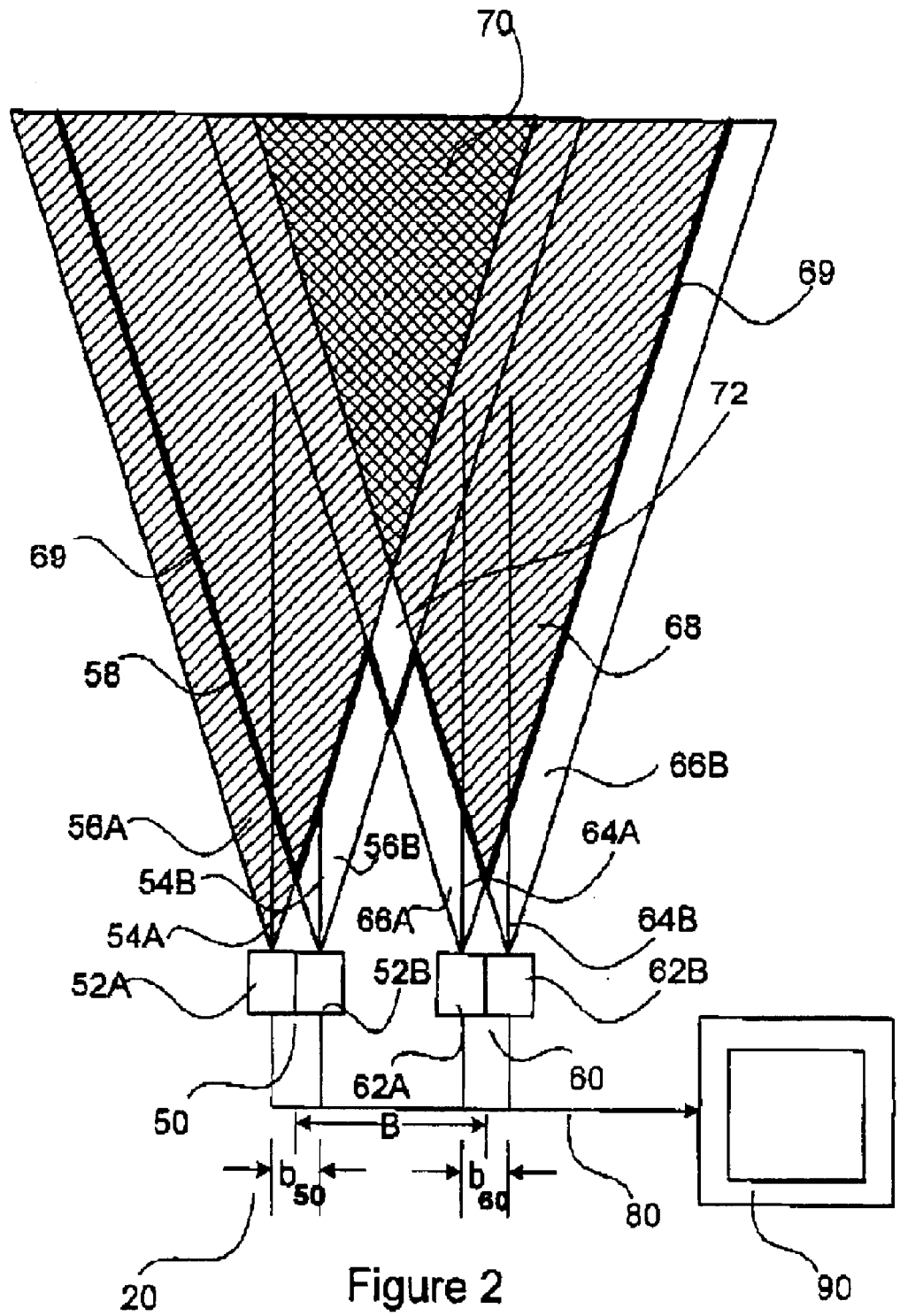
FIG. 2 is a schematic representation of a three-dimensional imaging system according to one embodiment of the present invention.

FIG. 2 is a schematic representation of the principal components of a multi-nodal, three-dimensional imaging system 20 according to one embodiment of this invention. Three-dimensional imaging system 20 comprises at least two stereo measurement units (50 and 60). Each stereo measurement unit 50 comprises at least two spaced-apart sensors. Each stereo measurement unit is capable of acquiring information from which locations of objects in space can be determined. In the embodiments described below, the sensors comprise imaging devices which may comprise digital cameras.

Any suitable three-dimensional measurement units could be used as, or in place of, stereo measurement units 50. For example, three-dimensional stereo or non-stereo measurement units which include other types of sensors such as infra-red detectors, acoustic detectors, radar detectors and/or laser range-finders could be used.

In the embodiment of FIG. 2, stereo measurement unit 50 comprises two spaced-apart imaging devices 52A and 52B, which have optical axes 54A and 54B respectively. Imaging device 52A has a field of view covering a three-dimensional region 56A. Imaging device 52B has a field of view covering a three-dimensional region 56B. Regions 56A and 56B overlap within a three-dimensional first stereo measurement field 58.

Similarly, stereo measurement unit 60 comprises two spaced-apart imaging devices 62A and 62B, with optical axes 64A and 64B. Imaging device 62A has a field of view covering three-dimensional region 66A. Imaging device 62B has a field of view covering three-dimensional region 66B. Regions 66A and 66B overlap within a three-dimensional second stereo measurement field 68.

Stereo measurement units (50 and 60) are oriented such that first and second stereo measurement fields 58 and 68 overlap in a three-dimensional region 70. Any object within the volume of region 70 is within the stereo measurement fields of both of stereo measurement units 50 and 60. In this description, region 70 is sometimes referred to as an "overlapping stereo measurement field" or an "overlap region".

Figure 9:
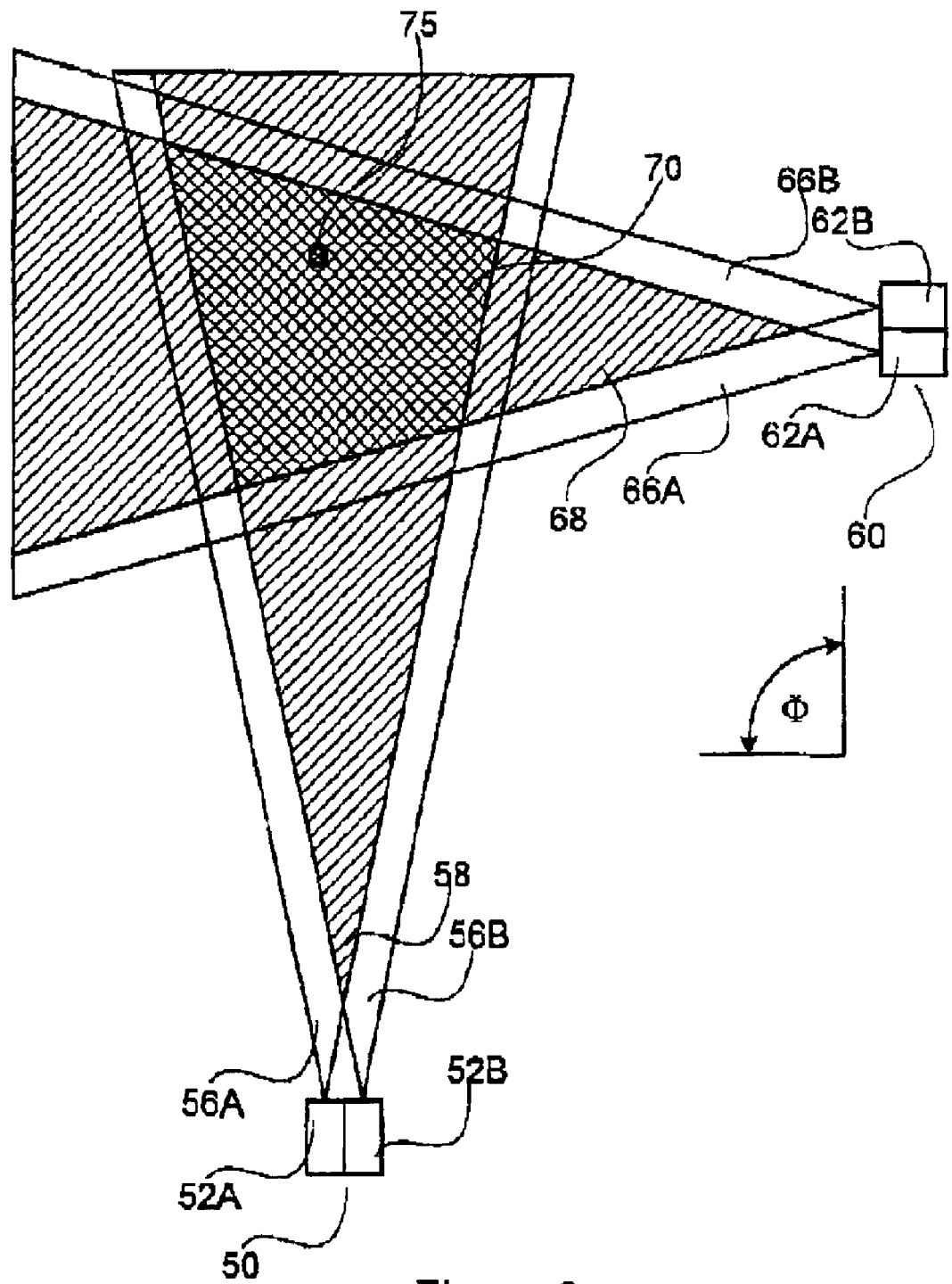
FIG. 9 is a schematic representation of a three-dimensional imaging system according to one embodiment of the invention, where the stereo measurement units are not aligned.

In FIG. 2, the optical axes (54A, 54B, 64A and 64B) of imaging devices 52A, 52B, 62A, and 62B are illustrated as being generally parallel to one another. This is not a general requirement. For example, FIG. 9 shows a case where stereo measurement units 50 and 60 are oriented so that the optical axes of their imaging devices are at an angle Φ to one another. In FIG. 9, Φ is approximately 90 degrees. This is not necessary, however. The locations and orientations of stereo measurement units (50 and 60) may be selected to give a desired shape to overlapping stereo measurement field 70.

Individual imaging devices 52A and 52B within stereo measurement unit 50 are spaced apart by a baseline $b_{50}$. Similarly, individual imaging devices 62A and 62B within stereo measurement unit 60 are spaced apart by a baseline $b_{60}$. In addition there is a baseline B which has a length corresponding to the translational distance between stereo measurement unit 50 and stereo measurement unit 60. In most applications (but not always), the baseline distances $b_{60}$ and $b_{50}$ (within stereo measurement units 50 and 60) are shorter than the length of baseline B (between stereo measurement units 50 and 60).

Assuming that each of stereo measurement units 50 and 60 is calibrated (i.e. the function F of equation (1), or an equivalent thereof, is known for each of stereo measurement units 50 and 60), then the locations of reference points which are located in the stereo measurement field of one of stereo measurement units 50 and 60 can be determined, relative to a local frame of reference, from data obtained by the imaging devices of that stereo measurement unit. The reference points may comprise objects, parts of objects, features of objects or the like. The locations of reference points on objects may be used to determine characteristic features of the objects. Such characteristic features of objects may include, without limitation, orientation, sizes, locations and shapes of edges and the like.

The calibration methods explained below permit system 20 to determine the positions of reference points and/or characteristic features of objects which are located within a combined measurement field relative to a common frame of reference (i.e. a common coordinate system). The combined stereo measurement field over which system 20 may be operative to determine the positions and/or features of objects comprises the union of stereo measurement fields 58 and 68. The common frame of reference may be the same as a local frame of reference associated with one of stereo measurement systems 50 or 60 or may be a different from either of the local frames of reference. Throughout this description and the accompanying claims, the terms "frame of reference", "reference frame" and "coordinate system" are used interchangeably and have the same meaning.

In some embodiments of the invention, the system 20 is capable of determining the positions and/or features of objects within an additional stereo measurement field, wherein the fields of view of imaging devices belonging to two different stereo measurement units overlap. In FIG. 2, region 72 comprises a portion of an additional stereo measurement field within which the fields of view of imaging devices 52B (which belongs to stereo measurement unit 50) and 62B (which belongs to stereo measurement unit 60) overlap. Line 69 is a boundary of a total stereo measurement field which can be achieved in such an embodiment of the invention. The total system stereo measurement field for these embodiments includes the union of stereo measurement fields 58, 68 and additional stereo measurement region 72.

In some cases, the accuracy with which the position and/or features of an object can be determined may be improved by determining the position of the object using data which includes data from sensors on different stereo measurement units. Such measurements can benefit from a longer baseline B between stereo measurement units (50 and 60).

In some embodiments of the present invention, stereo measurement units (50 and 60) are relatively far apart (i.e. baseline B is relatively large) in comparison to the baselines $b_{50}$ and $b_{60}$ of stereo measurement units (50 and 60). For example B may be more than 2½ times greater than either of $b_{50}$ and $b_{60}$.

For the sake of simplicity and ease of description, three-dimensional imaging system 20 is depicted in FIG. 2 as having only two stereo measurement units (50 and 60). In general, multi-nodal, three-dimensional imaging system 20 requires at least two measurement units, but may include more than two depending on accuracy requirements, coverage requirements and financial constraints of a particular three-dimensional imaging application.

Figure 8:
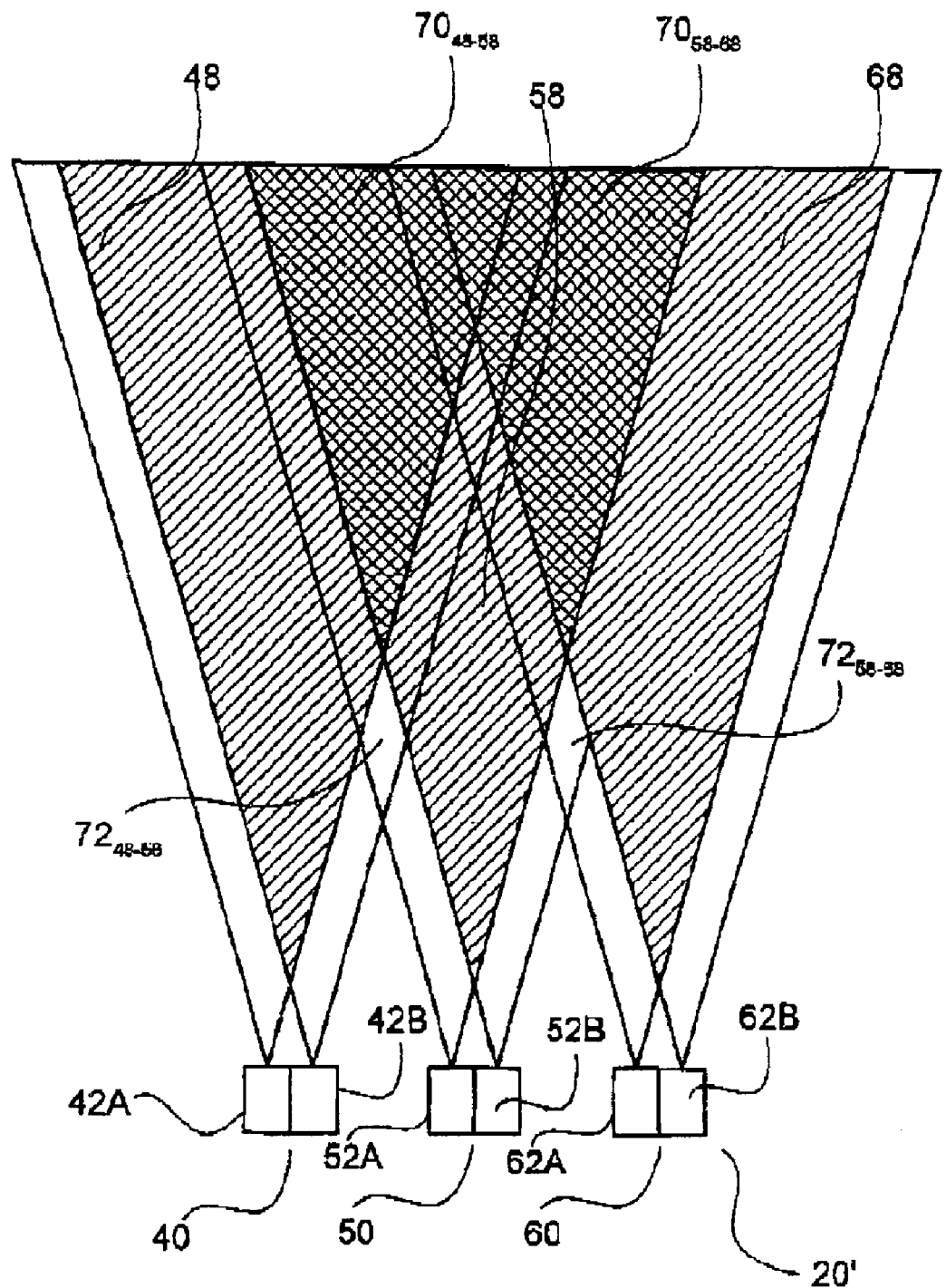
FIG. 8 is a three-dimensional imaging system employing three stereo measurement units.

System 20' of FIG. 8 comprises three stereo measurement units (40, 50 and 60). Each stereo measurement unit (40, 50 and 60) has a stereo measurement field (48, 58 and 68), within which the positions and/or features of objects can be determined from data obtained by the sensors of the stereo measurement unit. Each of the stereo measurement fields has a region of overlap with the stereo measurement field of at least one other stereo measurement unit. For example, stereo measurement fields 48 and 58 overlap within region $70_{48-58}$. Stereo measurement fields 58 and 68 overlap within region $70_{58-68}$.

In some embodiments of the invention, system 20' is adapted so that it can be calibrated to permit determination of the locations and/or features of objects, which are located within regions within which the fields of view of imaging devices belonging to different stereo measurement units overlap (even if the object is not within the stereo measurement field of any one of the stereo measurement units). For example, in such embodiments, the positions and/or features of object in region $72_{48-58}$ may be determined from data from imaging device 42B of stereo measurement unit 40 and imaging device 52A of stereo measurement unit 50.

Figure 7:
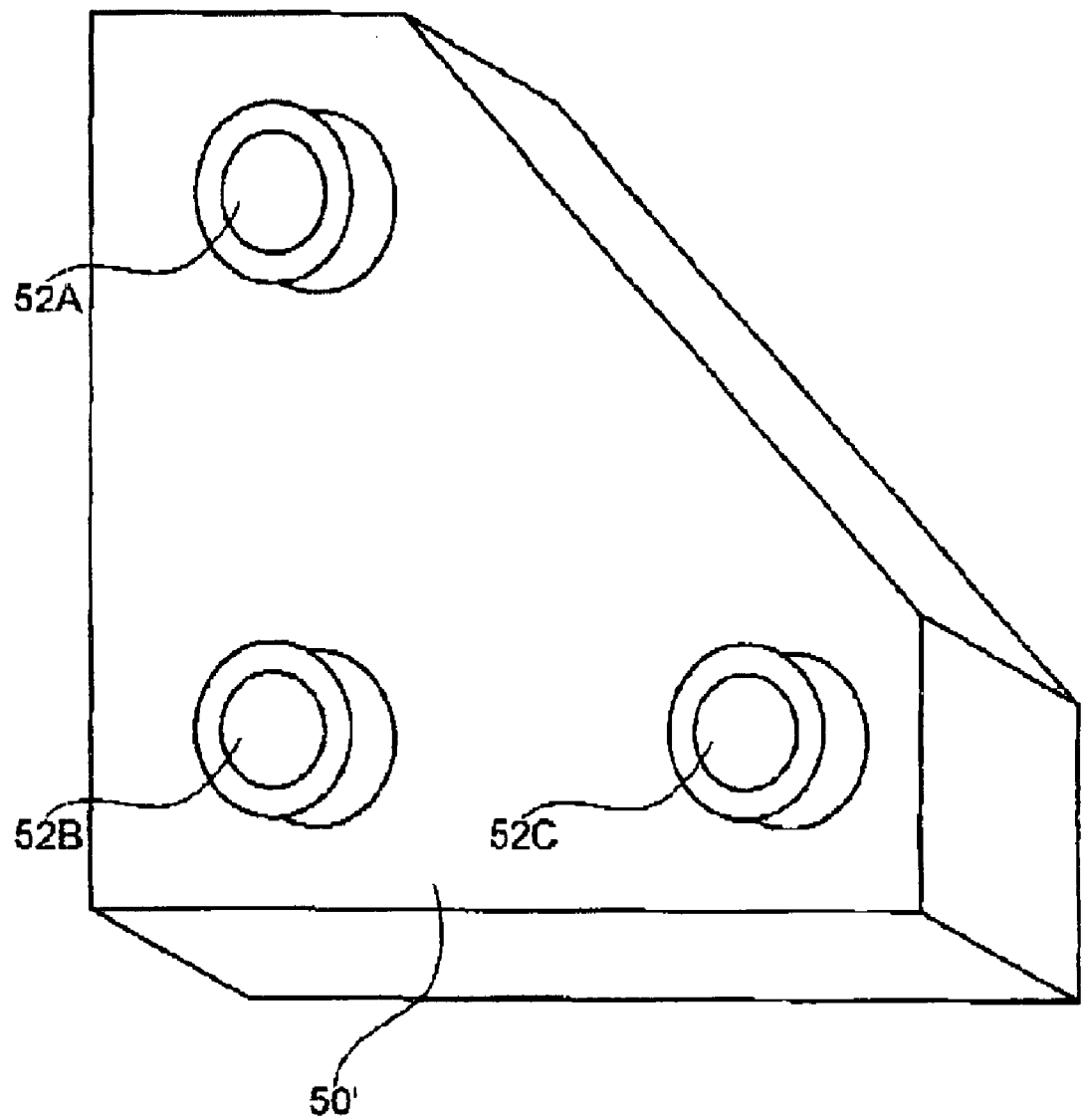
FIG. 7 depicts a preferred embodiment of a stereo measurement unit.

For clarity of explanation, each stereo measurement unit (for example, unit 50) is depicted in FIG. 2 as having only two imaging devices 52A and 52B. In general, each stereo measurement unit 50 has two or more imaging devices 52A and 52B. For example, each stereo measurement unit may comprise a DIGICLOPS™ stereo vision camera unit available from Point Grey Research Inc. of Vancouver, Canada. Such stereo vision camera units each comprise three digital cameras mounted rigidly to one another in a triangular configuration as shown in FIG. 7. Stereo camera measurement unit 50' of FIG. 7 includes a top camera 52A, left camera 52B and right camera 52C. Each camera comprises a CCD sensor (not shown) which generates a digital image of objects win the camera's field of view.

As discussed above, the invention can be practised using measurement units in which the imaging devices comprise sensors other than cameras. In some alternative embodiments of the invention, three-dimensional imaging system 20 or individual stereo measurement units (50 and 60) may even comprise imaging devices of different types. For example, in a stereo measurement unit, one imaging device may comprise a digital camera, while another imaging device comprises an acoustic sensor.

Figure 3:
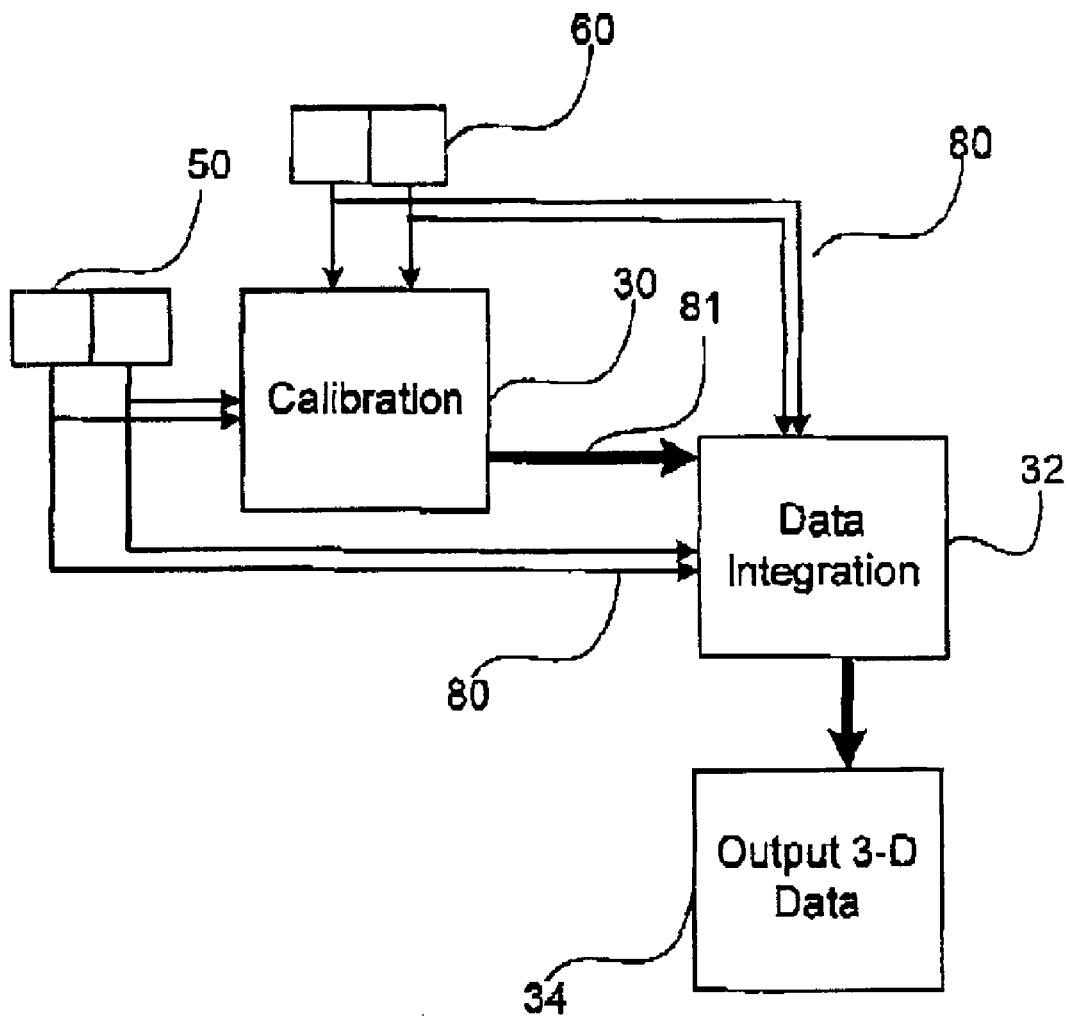
FIG. 3 shows the data flow between individual imaging devices, and the processor involved in calibration and data integration.

FIG. 3 is a high level schematic representation of a method for processing the image data 80 obtained from the individual imaging devices (52A, 52B, 62A and 62B) of system 20 of FIG. 2.

Image device data 80 may be acquired simultaneously from all imaging devices (52A, 52B, 62A and 62B) or may be acquired sequentially from each such device. After acquisition and digitization (if required), image device data 80 is directed to a processor (not shown in FIG. 3). The image device data 80 may be carried over any suitable interface. The IEEE 1394 and USB interfaces are but two examples. Within the processor, a calibration process 30 processes image device data 80 to determine calibration function(s) for determining the positions and/or features of objects in a common frame of reference. The calibration function(s) depend upon the spatial positions and orientations of stereo measurement units 50 and 60 relative to one another. Calibration process 30 produces a set of calibration parameters 81 which characterize the calibration function(s).

Depending on the application requirements, calibration process 30 may be performed continuously, each time that system 20 starts up, at preselected time intervals, on the occurrence of a preselected event or when specified by external commands. Data integration process 32 uses calibration parameters 81 along with image device data 80, to determine the positions and/or features of objects in the common coordinate system. Some of the objects or features may be only within the stereo measurement field of stereo measurement unit 50, others may be only within the stereo measurement field of stereo measurement unit 60. In some embodiments of the invention other objects may be within additional stereo measurement field 72, but not within the stereo measurement field of either one of the stereo measurement units.

In data integration process 32, a single "point cloud" which specifies the positions and/or features of objects is obtained from image data 80 and calibration parameters 81. A point cloud is a set of points having positions specified in a common coordinate system.

Output process 34 receives data specifying a single three-dimensional point cloud with a common coordinate system. Output process 34 may then provide three-dimensional data relating to the objects in the overall system stereo measurement field for any desired application. Three-dimensional data may include characteristics of objects (e.g. size, position and orientation) that are in the overall system stereo measurement field and output process 34 may, for example, involve tracking such object characteristics over time.

The method of FIG. 3 may be performed by a data processor executing software instructions, by hardware configured to perform the method or by a combination of hardware and software. The method may be performed at a central location, such as within a computer 90 (see FIG. 2) or may be distributed. Calibration process 30, data integration process 32 and output process 34 may be performed in a single hardware device and their functionality may be achieved by a single software program. It will be appreciated by those skilled in the art, however, that these processes may be performed by distinct hardware or software elements in communication with one another and that these distinct hardware or software elements may be located within individual stereo measurement units or in a separate computer system 90.

In one embodiment of the invention, calibration process 30, data integration process 32 and output process 34 are implemented using a conventional computer 90 equipped with suitable software and interface hardware (see FIG. 2). In this manner computer 90 exists as an independent entity which can be linked to the rest of three-dimensional imaging system 20 as and when required. Alternatively, calibration process 30, data integration process 32 and output process 34. may be implemented using an embedded microprocessor system (not shown) that is an integral part of one of the elements of three-dimensional imaging system 20. An embedded system implementation can be well adapted to applications involving continual monitoring or tracking or in environments where the positions or alignments of stereo measurement units 50 and 60 are prone to change.

In a further alternative embodiment, each of stereo measurement units 50 and 60 is equipped with its own on-board hardware or hardware-software combination configured to perform calibration process 30. In such embodiments of the invention, data integration process 32 and output process 34 may be implemented using a central computer 90 or an embedded processor (not shown). In such embodiments of the invention, stereo measurement its 50 and 60 may output raw image data or may process the image data and output processed data. For example, stereo measurement units may output data specifying the locations of points in a point cloud in some coordinate system.

In yet another embodiment, a portable calibration device (not shown) containing a processor for performing calibration process 30 and suitable I/O hardware is used. The portable calibration device may be connected to stereo measurement units in turn and used to sequentially calibrate all of the stereo measurement units 50 and 60. After calibration process 30 is performed by such a detachable device, data integration process 32 and output process 34 may be implemented on a central computer 90 or an embedded processor which receive calibration information from the portable calibration device. A portable calibration device may comprise a portable computer processor, programmable hardware, such as a field programmable gate array or the like.

Figure 4:
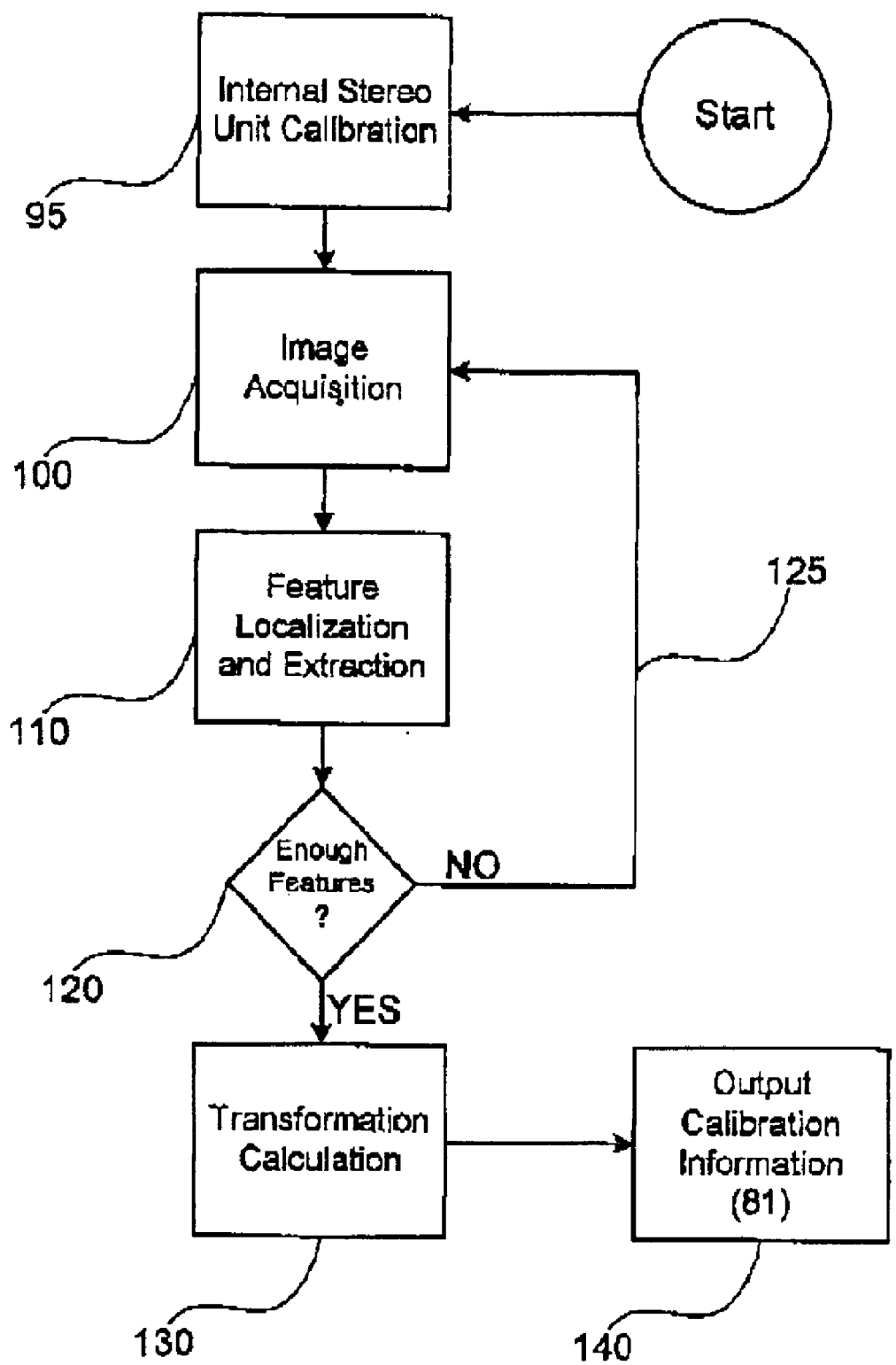
FIG. 4 is a flow chart depicting an embodiment of the calibration process for a three-dimensional imaging system.

FIG. 4 is a flow chart depicting a method for calibrating a three-dimensional imaging system 20 according to one embodiment of the invention. The result of calibration process 30 is calibration parameters 81, which comprise information specifying a set of one or more transformations. The set of transformations transforms positions and/or features of objects derived from the image data 80 from each stereo measurement unit (50 and 60) to a common frame of reference. The transformations depend upon the relative positions and orientations of each of the stereo measurement units (50 and 60) with respect to the common frame of reference. The positions and orientations of each of the stereo measurement units may vary in the common frame of reference in six degrees for freedom (three translational and three orientational).

Referring to FIGS. 2 and 4, an internal calibration process 95 performs internal calibration of stereo measurement units 50 and 60. Internal calibration process 95 obtains calibration information as between individual imaging devices (52A, 52B, 62A and 62B) within each such stereo measurement unit 50 and 60. This may be done according to any suitable technique. For example, calibrating a stereo measurement unit may involve placing a known object at a known location relative to the stereo measurement unit, obtaining images of the object from a plurality of imaging devices of the stereo measurement unit, locating an image of a reference point on the object in each of a plurality of the images and deriving calibration information from the known actual location of the reference point and the locations of the image of the reference point. Internal calibration process 95 may comprise retrieving previously obtained internal calibration information.

When internal calibration information has been obtained from all of the stereo measurement units in system 20, the internal calibration information can typically be retained for a relatively long period of time without recalibration, since the imaging devices of stereo measurement units 50 and 60 are typically rigidly and stably mounted to one another.

After internal calibration process 95, the function (transformation) which permits the position of a reference point to be determined in the local coordinate system of stereo measurement unit 50 from image data obtained by imaging devices 52A and 52B is known. Similarly, the function (transformation) which permits the position of a reference point to be determined in the local coordinate system of stereo measurement unit 60 from image data obtained by imaging devices 62A and 62B is known. These functions (trasformations) are equivalent to function F of equation (1). Thus, after the completion of process 95, the processor can determine the three-dimensional position and/or features of an object within the stereo measurement field (58 or 68) of the corresponding stereo measurement unit (50 or 60) relative to a reference frame local to that stereo measurement unit.

Image acquisition process 100 involves obtaining images of one or more calibration targets and providing resulting image device data 80 obtained by each of imaging devices 52A, 52B, 62A and 62B to a processor. One or more calibration targets is placed in overlapping stereo measurement field 70. Each calibration target is a known object having one or more features. The calibration target is within stereo measurement fields 58 and 68 of both stereo measurement units 50 and 60.

Image data 80 may be transferred to the processor simultaneously for all stereo measurement systems 50 and 60 or at different times for different stereo measurements systems. The image data 80 may be acquired simultaneously or image device data 80 from different stereo measurement units (50 and 60) may be obtained at different times. The choice of whether to acquire all image device data 80 simultaneously or sequentially and whether to deliver the image device data 80 to a processor simultaneously or at different times depends on a number of factors, including:

- the processing power of the processor performing calibration process 30, data integration process 32 and output process 34;
- the bandwidth of the interface between imaging devices and the processor;
- the resolutions of imaging devices 52A, 52B, 62A and 62B, (this determines the total amount of data that must be processed); and,
- whether the stereo measurement units 50 and 60 or calibration targets employed are likely to move.

If the processor speed is relatively low and the resolution of imaging devices 52A, 52B, 62A and 62B is relatively high, then it can be desirable to acquire image device data 80 sequentially. In contrast, if the calibration target(s) and/or stereo measurement units 50 and 60 might move during calibration, then image device data 80 should be acquired simultaneously to maintain accurate correspondence between the image device data 80 captured from imaging devices 52A, 52B, 62A and 62B.

Feature localization and extraction process 110 involves locating relevant calibration targets and particular calibration features from image device data 80. During feature localization and extraction process 110 image device data 80 from the field of view of each imaging device 52A, 52B, 62A and 62B is processed to locate at least one calibration feature of a calibration target. Assuming that a calibration target having a calibration feature is within stereo measurement field 58, the three-dimensional location of that calibration feature maybe determined in the local coordinate system of stereo measurement unit 50 from image data 80 of imaging devices 52A and 52B and the internal calibration information obtained in internal calibration process 95. Similarly if the same calibration feature is also in stereo measurement field 68, the three-dimensional location of the calibration feature may determined relative to the local coordinate system of stereo measurement unit 60 from image data 80 of imaging devices 62A and 62B and the internal calibration information obtained in internal calibration process 95. Feature localization process 110 may be implemented in various ways.

A first embodiment of the invention depicted in FIG. 2 involves a configuration where stereo measurement units 50 and 60 are similarly oriented. In such an embodiment, a suitable calibration target may comprise a planar object. Examples of suitable calibration targets include planar surfaces marked with one or more circular dots, planar surfaces marked with one or more squares or rectangles, "checkerboard patterns" and the like. Preferably, the markings on the planar surface contrast with the surface.

For a single dot shaped calibration target, the calibration feature extracted during feature localization and extraction process 110 may be the center of the dot. The three-dimensional position of the calibration feature (i.e. the center of the dot) may be extracted from image device data 80 in the local coordinate systems for each stereo measurement unit 50 and 60.

In a second embodiment shown in FIG. 9, stereo measurement units 50 and 60 are oriented in substantially different directions. With such a configuration, a planar dot calibration target may produce spurious results, because the dot may appear distorted from the perspective of one or more of imaging devices 52A, 52B, 62A and 62B. In such cases, it may be preferable to use a calibration target 75 comprising a spherical object. The calibration target preferably has a surface which contrasts with the background. For example, the calibration target may comprise a black sphere imaged against a white background. A spherical calibration target has the same appearance when viewed from any angle. With a spherical calibration target, the calibration feature extracted during feature localization and extraction process 110 may be the center of the sphere. Spherical calibration targets are also useful where imaging devices 52A, 52B, 62A and/or 62B comprise laser range-finding devices (not shown).

Figure 10:
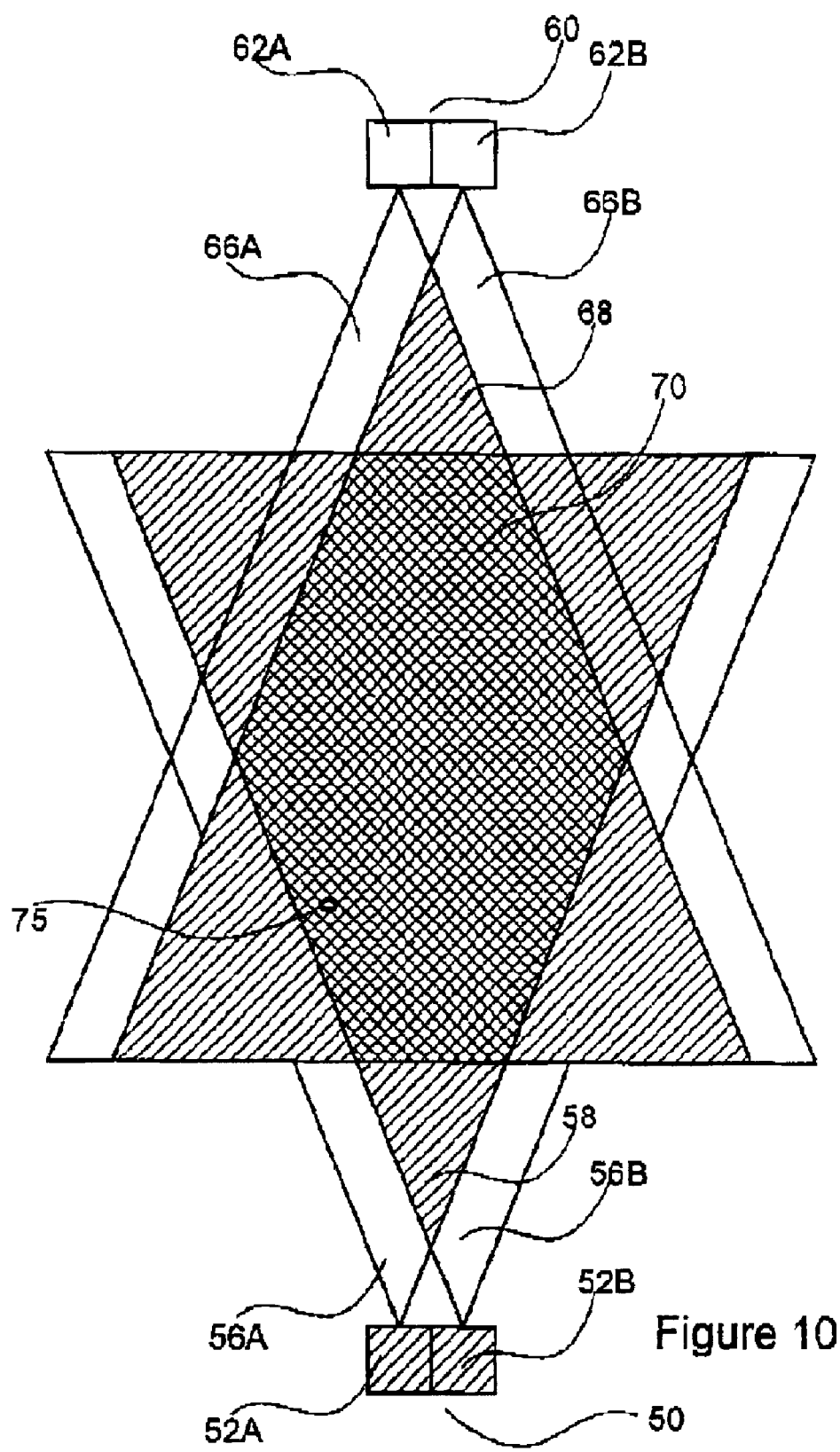
FIG. 10 is a schematic representation of a three-dimensional imaging system according to another embodiment of the invention, where the stereo measurement units are not aligned.

Other known objects may be used for calibration targets. For example, in the embodiment of FIG. 10, where the stereo measurement units 50 and 60 are oriented to oppose one another, a suitable calibration target may comprise a two-sided planar dot. In this case the calibration feature may comprise the center of the dot.

In another embodiment of the feature localization and extraction process 110, specialized calibration targets may not be required. Such an embodiment may make use of features localized and extracted from ordinary scenes. One example, of such a feature extraction technique is known as Scale Invariant Feature Transform ("SIFT"). SIFT technology is described in David C. Lowe, *Object Recognition for Local Scale-Invariant Features* (Proc. of International Conference on Computer Vision, Corfu (September 1999)), which is hereby incorporated by reference. In general, any discernable feature contained in the stereo measurement field of the stereo measurement units sought to be calibrated may be used as a calibration feature using SIFT. Depending on the type of feature extracted, the information determined from the calibration feature using this type of technique may include three-dimensional position and/or orientation information.

Yet another embodiment of the feature localization and extraction process 110, involves a three-dimensional model-based object recognition algorithm capable of determining the three-dimensional position and the orientation of a predefined object. Such a system may employ a measurement unit comprising monoscopic or stereoscopic image sensor to obtain image data from within its field of view. The model-based-object recognition algorithm then compares that image data to data about one or more predefined objects. In an embodiment employing model-based-object recognition, data specifying one or more calibration features may permit the location and orientation of a three-dimensional calibration target to be determined. Such information can be a sufficient basis for determining the transformations in step 130 (see further discussion below).

Figure 5:
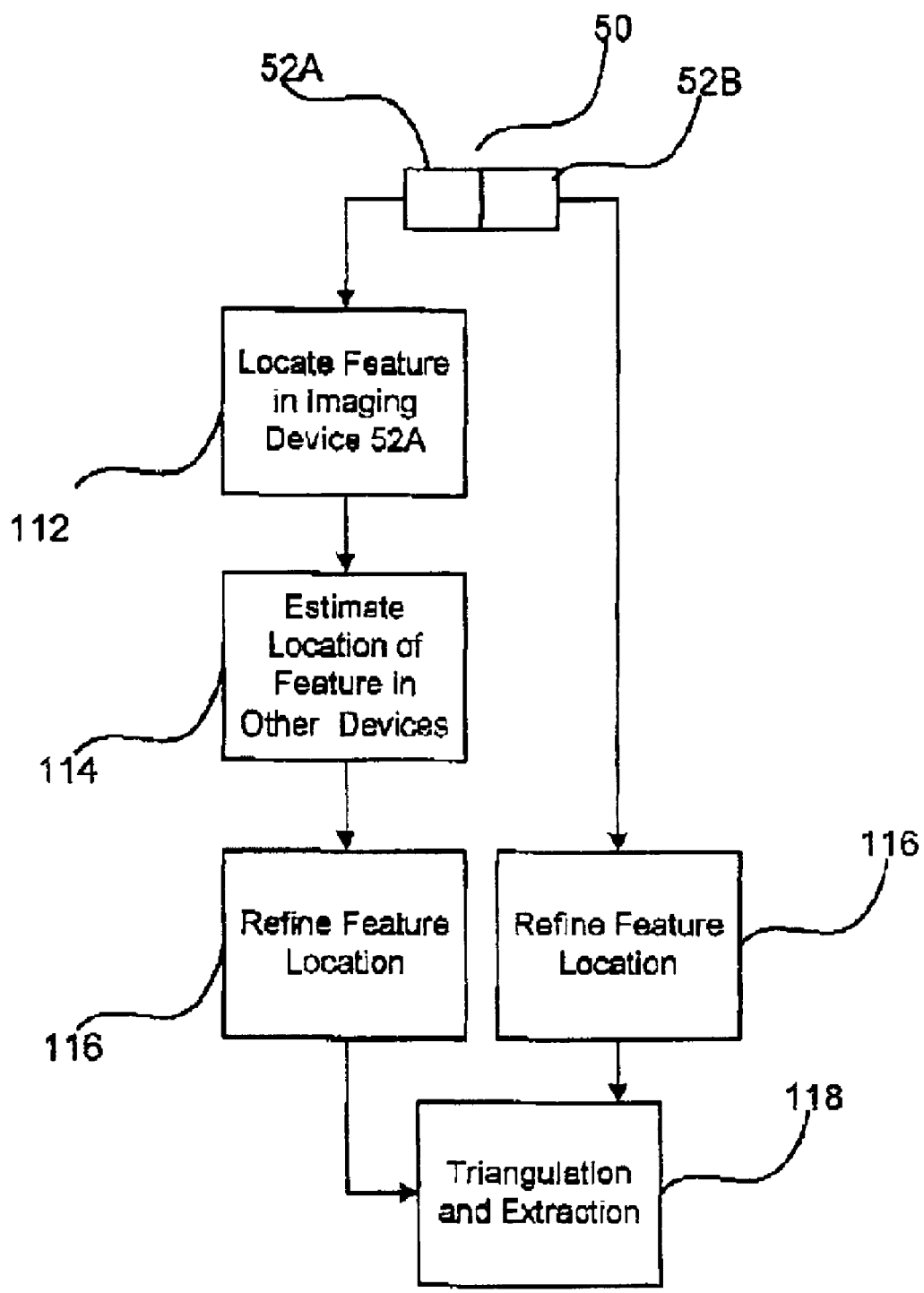
FIG. 5 is a flow chart depicting an embodiment of the feature localization and extraction process for a particular stereo measurement unit according the present invention.

FIG. 5 is a flowchart that depicts an example method for feature localization and extraction. Feature localization and extraction may be performed separately for each stereo measurement unit. In the example of FIG. 5, the calibration target comprises a planar dot and the center of the dot is the calibration feature.

In feature location step 112, the raw image data 80 from a reference one of the imaging devices (for examples imaging device 52A) is received and the dot is located within that image data. Step 112 outputs the two-dimensional location of the dot center in the image produced by the reference imaging device. The dot may be located by way of any of a variety of feature recognition methods. For example, a Hough transform may be performed on the image data 80 to locate circles (i.e. dots) and their centers represented in the image data. Hough transforms are described in U.S. Pat. No. 3,069,654, which is hereby incorporated by reference. After the dot is located, the two-dimensional location of its center (i.e. the calibration feature) can be refined by employing the same Hough transform to search within a restricted search area.

Optional estimation step 114 employs knowledge of the size of the dot located in step 112, the internal calibration parameters of stereo measurement unit 50 and the focal lengths of the various individual imaging devices (52A and 52B) within that stereo measurement unit 50 to estimate the two-dimensional position at which the dot is likely to be found within the image data 80 of the other imaging devices in the stereo measurement unit (in the illustrated embodiment, the only other imaging device is imaging device 52B).

If estimation step 114 is not performed then the two-dimensional location of the calibration feature my be located within the image data 80 of the non-reference imaging device 52B in a different way, for example by using a Hough transform process similar to step 112. Estimation step 114 is useful to reduce the amount of processing required to locate the calibration feature in two-dimensions within the image data 80 of the non-reference imaging device 52B. Estimation step 114 particularly increases efficiency in embodiments (not shown) where there are more than two imaging devices in a stereo measurement unit.

Optionally the two-dimensional location of the dot center within the image data 80 of each individual imaging device (52A and 52B) may be further refined in step 116 to sub-pixel accuracy. Step 116 may comprise obtaining a histogram of binarized pixel values in the region of the dot and then determining a best fit of the binarized pixels to a circle.

Triangulation process 118 involves using the locations of the two-dimensional calibration features from each imaging device 52A and 52B to determine the three-dimensional location of the calibration feature. This may be done using conventional triangulation techniques. For example, the following stereo triangulation equations may be used to locate the center of a calibration target:

$$z = \frac{b \cdot f}{d} \quad (2)$$

$$x = \frac{z \cdot u}{f} \quad (3)$$

$$y = \frac{z \cdot v}{f} \quad (4)$$

where:
- (x, y, z) is the location of the dot center in the three-dimensional local coordinate system of the stereo measurement unit;
- (u, v) are the coordinates of the dot center in the reference camera;
- b is the baseline;
- d is the disparity value, reflecting the difference in two-dimensional position of the dot center in the non-reference camera as compared to its two-dimensional position in the reference camera; and,
- f is the focal length of the cameras (in this example the cameras are each assumed to have the same focal length. This is convenient but not absolutely necessary).

The method of FIG. 5 is repeated for each stereo measurement unit involved in the calibration.

Returning to FIG. 4, step 120 determines whether enough information has been obtained to determine a transformation which permits position information obtained from all of two or more stereo measurement units to be expressed in a common coordinate system. If not, then feature localization and extraction loop 125 is repeated for different calibration features until sufficient information has been obtained.

In general, there are six degrees of freedom (i.e. three degrees of translational freedom and three degrees of orientational freedom) which specify the position and orientation of the local reference coordinate systems of two stereo measurement units relative to one another. The number of repetitions of image acquisition process 100 and feature localization and extraction process 110 depend on the type of calibration targets and calibration features used. For example, where a calibration feature is a point in space (i e. the center of a dot), the extraction of one such calibration feature in process 110 yields information about only three translational degrees of freedom. In general it is necessary to know the locations of three points in space (or to have equivalent information from which those locations could be determined) in each of two local coordinate systems to be able to define a transformation between the coordinate systems (or a set of transformations to a common coordinate system). The three points may comprise different reference points on a single calibration target (e.g. a corner and points on edges of a cube), reference points on a plurality of different calibration targets, or the same reference point of a single calibration target which is moved to at least three positions within region 70.

In some applications, the number of calibration features extracted may exceed the minimum number of calibration features required. For example, where the calibration feature is a point, the minimum number of extracted calibration features required to obtain the six degrees of freedom is three. However the accuracy with which the transformations to a common frame of reference may be determined may be improved by using additional calibration features. The additional calibration features are redundant in that they can be omitted and a set of transformations to a common frame of reference could still be determined. For this type of application, the threshold of query 120 can be set arbitrarily high.

Step 130 uses the information obtained in loop 125 to generate a set of transformations from the local coordinate systems of the plurality of stereo measurement units to a common coordinate system. The common coordinate system may be the same as the local coordinate system for one of the stereo measurement units. Calibration parameters 81 may comprise information regarding the positions and orientation of stereo measurement units 50 and 60 along with the set of transformations calculated in step 130.

The transformation(s) produced by step 130 may, for example, be expressed as matrices, which transform position information in the local coordinate systems of stereo measurement units 50 and 60 to position information in the common coordinate system.

Figure 11:
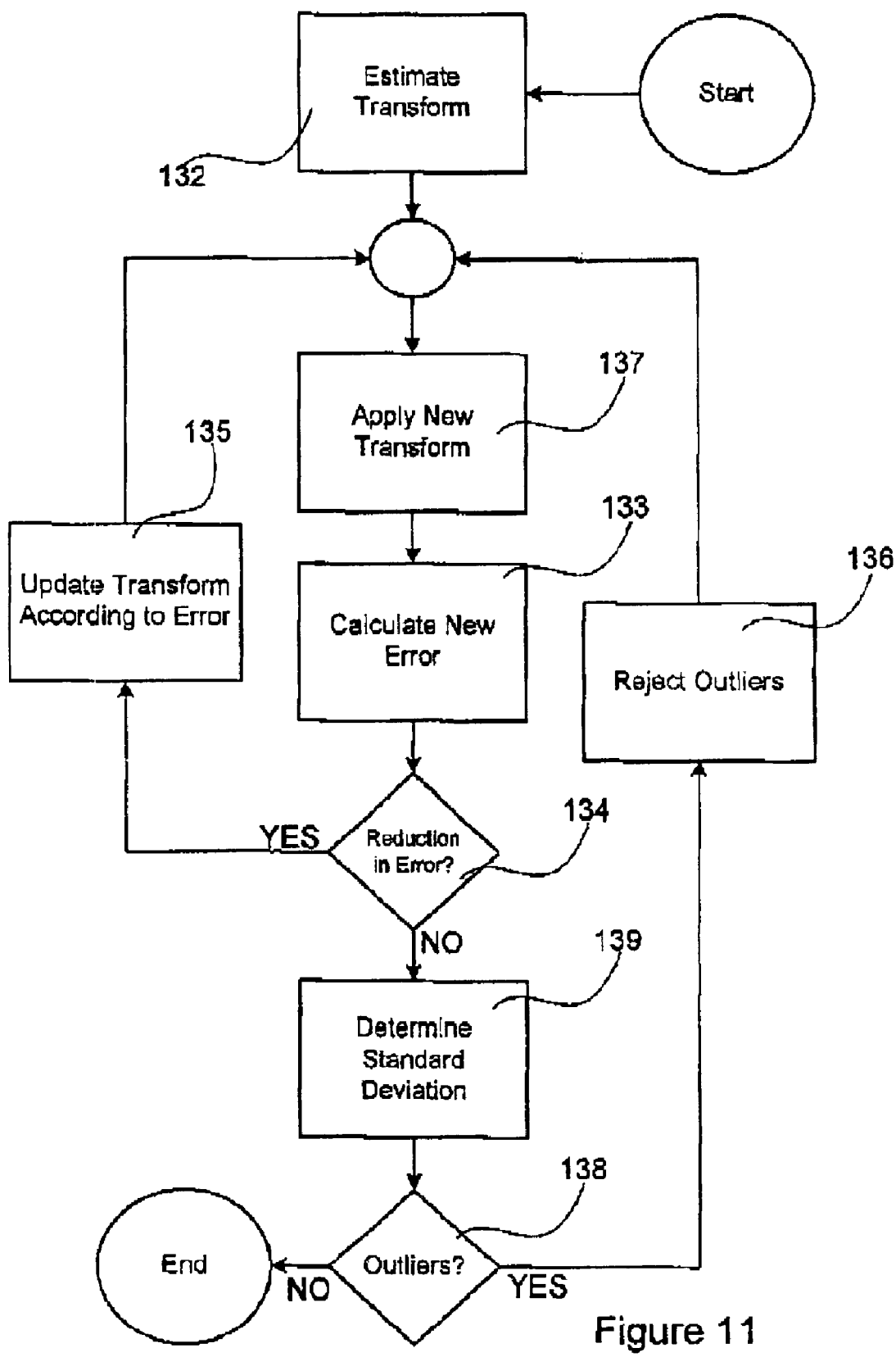
FIG. 11 is a flow chart depicting an embodiment of the transformation calculation process for a three-dimensional imaging system.

One way to obtain the transformation to a common coordinate system is to perform an iterative least-squares algorithm. FIG. 11 depicts one possible method which may be used to obtain a transformation in step 130. In the embodiment of FIG. 11, one stereo measurement unit (for example, unit 50) is selected to be the "master" unit. The common coordinate system is chosen to be the same as the local coordinate system for the master unit. Transformations are calculated for one or more "slave" stereo measurement units (for example, unit 60). The calculated transformation(s) transform the reference coordinate system of the slave unit 60 to that of the master unit 50. In three-dimensional imaging systems employing three or more stereo measurement units (see FIG. 8), a process similar to that of FIG. 11 may be performed for each slave stereo measurement unit.

In a further alternative embodiment, there need be no master and slave stereo measurement units and a transformation could be applied to image data from every stereo measurement unit.

For the purposes of explaining the transformation calculation process of FIG. 11, it is assumed that stereo measurement unit 50 is the master unit and that a transformation is sought for the image data 80 from stereo measurement unit 60. The calculation and optimization process depicted in FIG. 11 is an iterative process that begins by obtaining an estimated transformation in step 132. The estimated trasformations may be based upon on system parameters. In the alternative, the estimated transformation may be some predetermined transformation.

A master calibration point set specifying the locations of a plurality of calibration features in the local coordinate system of the master stereo measurement unit is obtained in feature localization and extraction process 110 as described above. Similarly, a slave calibration point set specifying the locations of the plurality of calibration features in the local coordinate system of the slave stereo measurement units is obtained for each slave stereo measurement unit as described above.

For each slave measurement unit, the current transformation (which, in the initial iteration is the estimated transformation) is applied to the corresponding slave calibration point set to yield a transformed slave point set in step 137. In error calculation step 133, the transformed slave point set is compared to the master calibration point set and an error in the current transformation is determined. In some embodiments the error is expressed as an error matrix. The error may be determined by evaluating the distance between each transformed slave point and a corresponding calibration point in the master point set. A residual error, such as the sum of the squared distance errors for each calibration point, indicates the "quality of fit" of the current transformation. In each iteration a record is kept of the residual error.

The error is used to generate a correction, which is applied to the current transformation in step 135. The correction may be, for example, represented as a correction matrix. The correction matrix may be expressed as a function of the error matrix and the matrix of partial derivatives of the current transformation as applied to each calibration point in the slave point set. The correction can be determined in a computer or other data processing mechanism using well-known mathematical techniques, such as an iterative least-squares algorithm.

Once the error is determined in error calculation step 133, the correction matrix is used to generate a new current transformation matrix in transformation update step 135. This may involve multiplying a current transformation matrix by a correction matrix. Transformation application steps 137 and error calculation step 133 are repeated. Step 134 determines whether the residual error calculated in step 133 is unchanged or has increased compared to the previous iteration. If the residual error is unchanged or has increased then the method proceeds to step 139.

The process then determines whether there are any redundant calibration features for which the positional error between the calibration feature in the master calibration point set and the corresponding feature in the transformed slave point set is statistically outlying. This may be done, for example, by computing an average and standard deviation of the positional error over the calibration features in the two point sets. Calibration features for which the positional error is more than, for example, two standard deviations away from the average may be considered to be statistically outlying. If there are statistically outlying calibration features as determined in step 138, then they are removed from consideration in step 136 and then the transformation is returned to transformation application step 137 for possible optimization. The transformation calculation and optimization are complete when there are no redundant statistically outlying calibration features and the answer to query 138 is negative.

In a preferred embodiment, a plurality of extra calibration features are localized and extracted during feature extraction loop 125 (see FIG. 4). If extra calibration features are localized and extracted during the feature extraction loop 125, they may be used for optimizing the calculation of the various transformations in transformation calculation step 130. Optimization techniques may include selective weighting of extracted calibration features that are located in regions of interest over extracted features that are located elsewhere, to provide the calculated transformations with more accuracy in the regions of interest. Alternatively, where a large number of calibration features are extracted, optimization techniques, such as weighting or clustering, may be used to ensure that the resultant transformations do not unevenly favour a region with a large number of calibration features. In addition, having extra calibration features allows for features to be dropped in step 136 (see FIG. 11), if they are statistically outlying.

Figure 6:
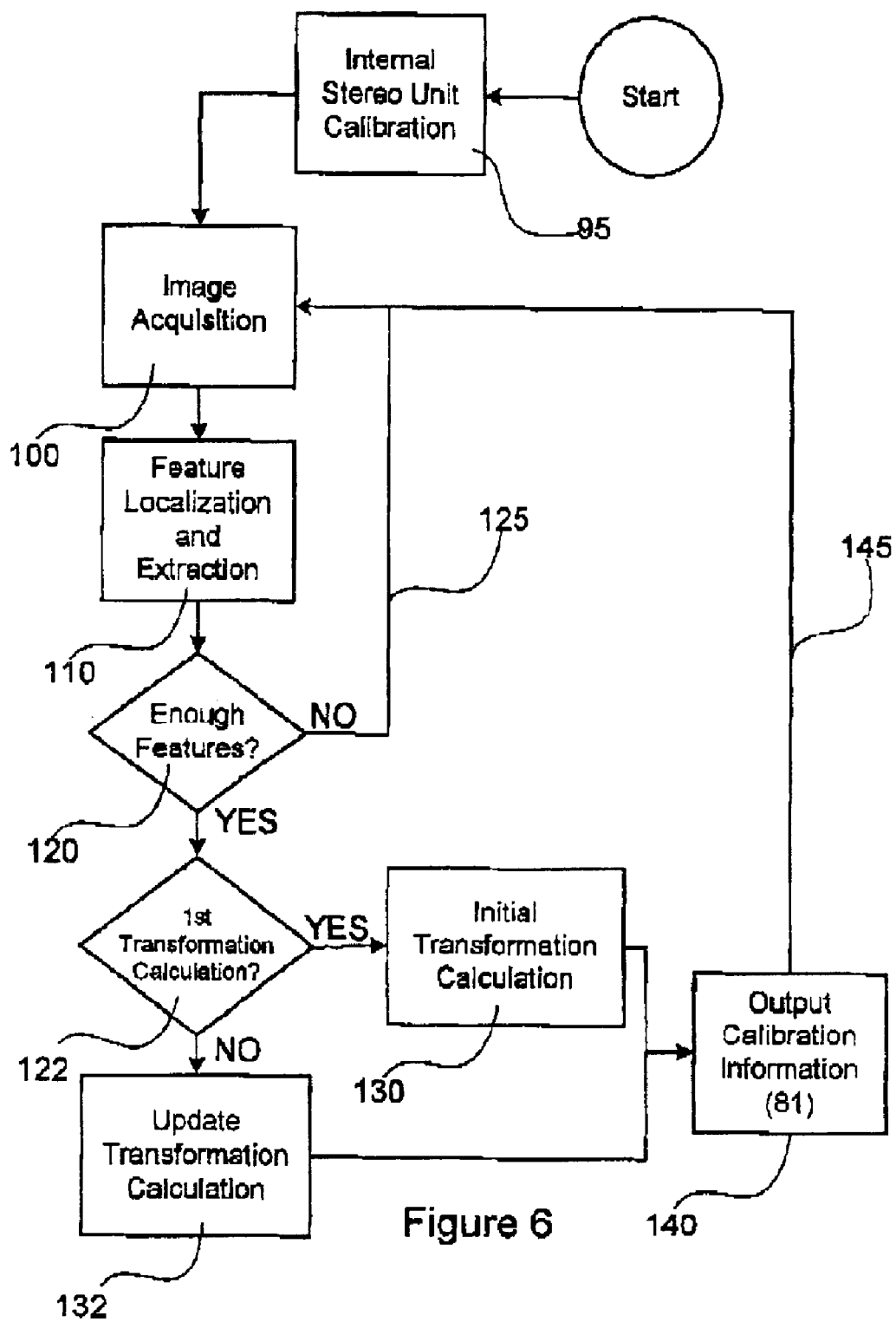
FIG. 6 is a flow chart depicting an alternative embodiment of the calibration process for a three-dimensional imaging system.

The algorithm of calibration process 30 depicted in FIG. 4 involves a single feature extraction loop 125, where all of the features are extracted prior to calculation of the transformation matrices in step 130. Another embodiment of calibration process 30, which is depicted in FIG. 6, involves continuously updating the transformation matrices in a calibration loop 145 and continually updating the calibration parameters 81. The embodiment of FIG. 6 involves he same initial steps: image acquisition process 100, feature localization and extraction process 110 and feature extraction loop 125. Once enough calibration features are extracted, the system performs an original transformation calculation in step 130 and outputs calibration parameters 81 in step 140, before looping back to acquire more image data in calibration loop 145. After a first transformation calculation is made in step 130, subsequent transformation calculations made in step 132 are used to update calibration parameters 81. In this manner, the transformation matrices and resultant calibration parameters 81 are optimized over time, by making use of a growing number of calibration features. After each transformation calculation, the updated calibration parameters 81 are output in step 140. Calibration loop 145 may be stopped at any time, if it is determined that calibration parameters 81 are sufficiently accurate or that a sufficient number of calibration features has been extracted.

The alternative methods depict in FIGS. 4 and 6 have various advantages in different applications. One advantage of the method depicted in FIG. 6 is that it allows calibration to become more accurate over time, because a large number of calibration features can be extracted. In addition, the embodiment of FIG. 6 involves continuously updating calibration, such that calibration may be restored even if stereo measurement units 50 and 60 are moved. In contrast, the method depicted in FIG. 4 allows a rapid calibration determination, because all of the calibration features are extracted prior to the calculation of the transformations in step 130. Because of the increased speed of calibration feature extraction, the method of FIG. 4 may be preferred in situations where processing resources are at a premium.

Figure 13:
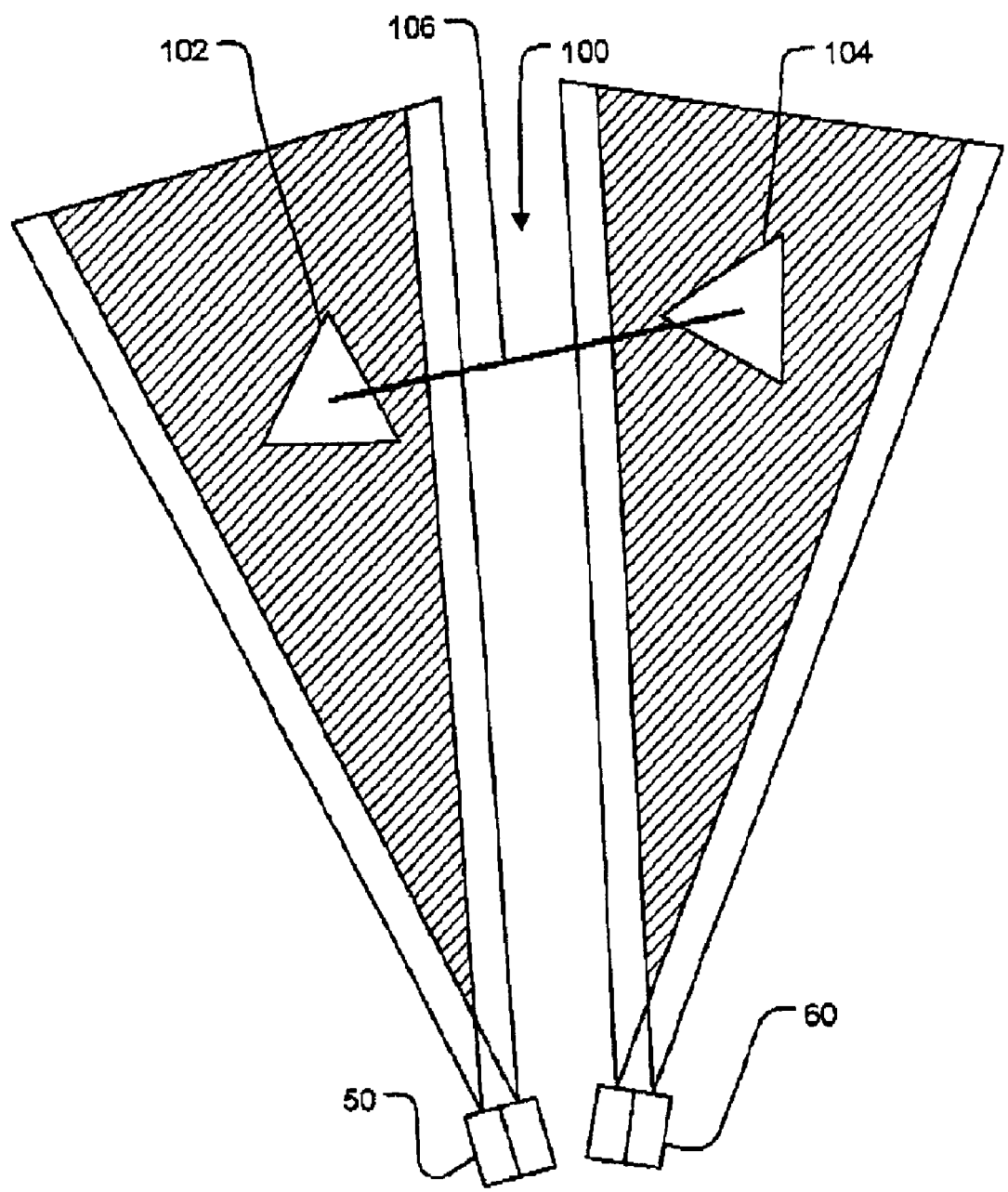
FIG. 13 is a schematic representation of an imaging system comprising a pair of measurement units having non-overlapping measurement fields; and, FIG. 14 is a flowchart depicting a method according to the invention.

The embodiments of calibration process 30 described above depend on locating and extracting calibration features that are contained in overlapping measurement field 70, which comprises parts of the stereo vision fields 58 and 68 (see FIG. 2). An alternative method of calibration illustrated in FIG. 13 uses a calibration target 100 that spans stereo measurement fields 58 and 68. Such a calibration target may comprise, for example, a pair of objects 102, 104 rigidly connected by a rod 106 or other member. The calibration target has a first set of calibration features in the first stereo measurement field 58 that have a known spatial relation to a second set of calibration features in the second stereo measurement field 68. Because the calibration features in each stereo measurement field have a known spatial relationship, if locations of the first set of calibration features are known in the local coordinate system of a first measurement unit then the locations of the second set of calibration features in the same local coordinate system can be determined from the known relationship between the two sets of calibration features. The locations of the second set of calibration features in the local coordinate system of a second measurement unit (as determined by data acquired by the second measurement unit) can then be used to determine a set of one or more transformations to a common coordinate system. With such a calibration technique, the individual measurement fields 58 and 68 may be non-overlapping as shown in FIG. 13.

Another alternative calibration technique for calibrating first and second stereo measurement its which have non-overlapping stereo measurement fields involves using one or more additional stereo measurement units which have stereo measurement fields which overlap with those of the first and second stereo measurement units. The additional stereo measurement(s) may be removed after calibration is completed. Assuming a configuration similar to that of FIG. 2, this embodiment does not require any overlap of stereo measurement fields 58 and 68. The extra stereo measurement may be inserted into the environment in such a manner that its stereo measurement field overlaps with measurement fields 58 and 68. Calibration may then be performed in the manner described above. After calibration, the extra measurement unit may be removed. Despite the removal of the extra measurement unit and the lack of overlap between measurement fields 58 and 68, measurement units 50 and 60 remain calibrated to one another as long as measurement units 50 and 60 do not move. Measurement units 50 and 60 may be used to obtain three-dimensional data in the common coordinate system.

Referring back to FIG. 3, after calibration process 30 produces calibration parameters 81, system 20 may be used to determine positions and/or features of objects within the overall system stereo measurement field. Data integration process 32 involves the application of the transformations to image data 80, in order to bring the image data 80 for stereo measurement units 50 and 60 into a common coordinate system. In data integration process 32, a single point cloud is obtained from the calibration parameters 81 and the image data 80. Output process 34 provides three-dimensional data relating to the objects in the overall system stereo measurement field for any desired application.

Figure 12:
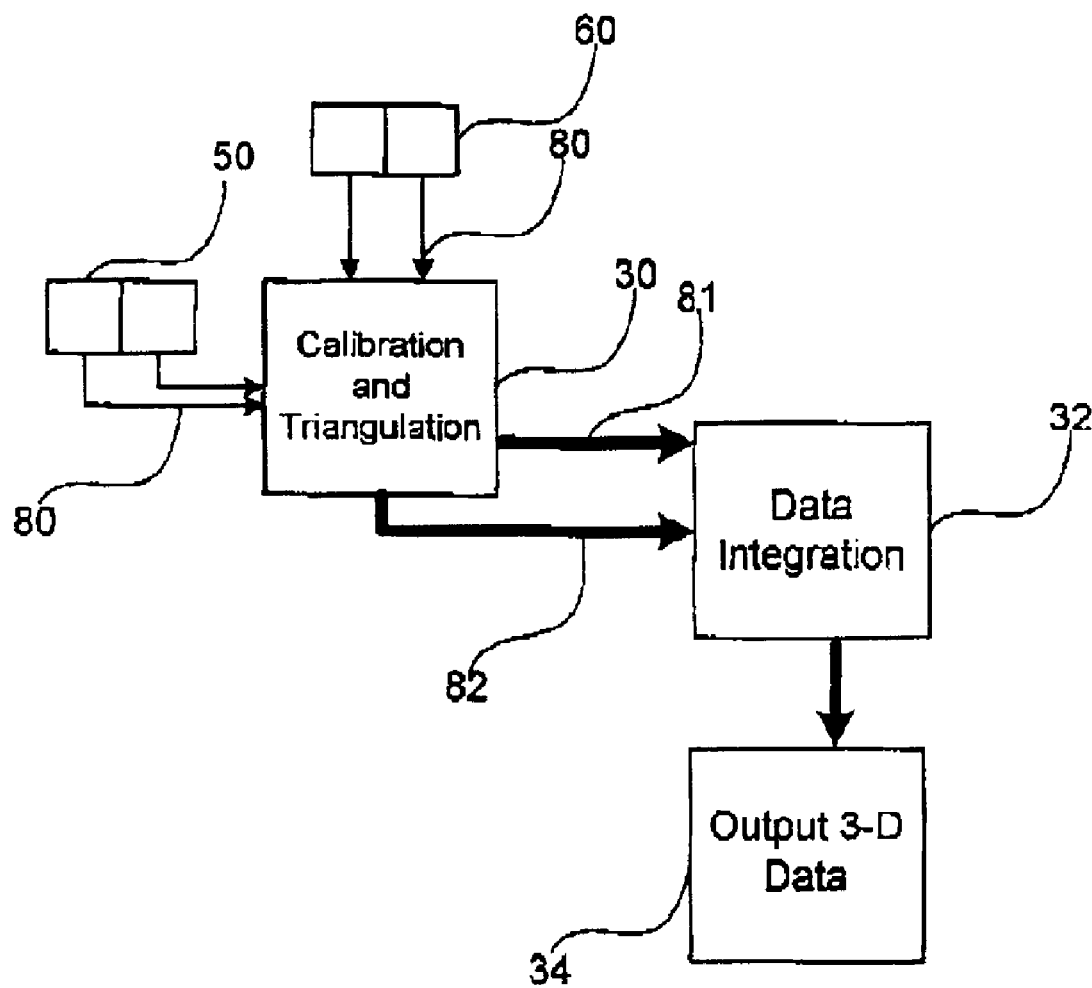
FIG. 12 is a schematic representation of an imaging system according to an alternative embodiment of the invention showing the data flow between individual imaging devices, and the processor involved in calibration and data integration.

FIG. 12 represents an alternative embodiment in which raw image data 80 from stereo measurement units 50 and 60 is directed to a calibration and triangulation process 30. Calibration and triangulation process 30 has a dual function involving the acquisition of calibration parameters 81 and the calculation of localized three-dimensional data 82. Calibration and triangulation process 30 may obtain calibration parameters 81 from the image data 80 according to one of the processes described above (see FIGS. 4 and 6). Calibration and triangulation process 30 triangulates the raw image data 80 to obtain localized three-dimensional data 82, which contains a three-dimensional point cloud of image data for each stereo measurement unit 50 and 60. Localized tree-dimensional data 82 is three-dimensional image data localized to the frame of reference of the individual stereo measurement units 50 and 60. After calibration and triangulation process 30, calibration parameters 81 and localized three-dimensional data 82 are directed to data integration process 32, which uses calibration parameters 81 to transform localized three-dimensional data 82 into a single common coordinate system. Data integration process 32 of FIG. 12 does not need to work with raw image data 80. The output process 34 of the FIG. 12 embodiment may be substantially similar to that of the FIG. 3 embodiment.

In a further alternative embodiment (not shown), triangulation of raw image data 80 to obtain localized three-dimensional data 82 may be performed in a separate triangulation process that precedes calibration process 30. In this manner, calibration is performed using only localized three-dimensional data 82.

The embodiments of FIGS. 3 and 12 have various advantages in different applications. One advantage of the method depicted in FIG. 12 is that the calibration and triangulation process 30 may be conveniently performed in a data processing system which is specifically associated with or embedded into a stereo measurement unit (i.e. 50 or 60), such that stereo measurement units need only output localized three-dimensional data 82 as opposed to raw image data 80. Stereo measurement units can be made as modular devices. The method of FIG. 3 is advantageous, because data integration process 34 receives raw image data 80 from individual imaging devices and may perform an algorithm for selecting the best pairing of individual imaging devices to provide most accurate three-dimensional data. For example (see FIG. 2), to measure the positions and/or features of an object in stereo measurement field 68 and close to stereo measurement unit 60, imaging devices 62A and 62B maybe selected; for objects in overlapping stereo measurement field 70, imaging devices 52A and 628 may be selected; and for objects in region 72, imaging devices 52B and 62A may be selected.

The system may optionally derive calibration information for pairs of imaging devices which do not lie within the same stereo measurement unit. This may be done by locating a number of object features which are both within a stereo measurement field of such a pair of imaging devices and within a stereo measurement field of a stereo measurement unit. From the known locations of the object features (as determined by the stereo measurement unit) a transformation can be derived which provides the position of an object feature in the common coordinate system from the positions of the object feature in image data from the pair of imaging devices.

In some cases, three-dimensional measurements of the positions of features on distant objects made by system 20 may have increased accuracy because the separation between stereo measurement units 50 and 60 (i.e. the baseline B) may be made arbitrarily large. Since three-dimensional measurements can also be made by a single stereo measurement unit, measurements can be made on objects that are relatively close to a stereo measurement unit.

Figure 14:
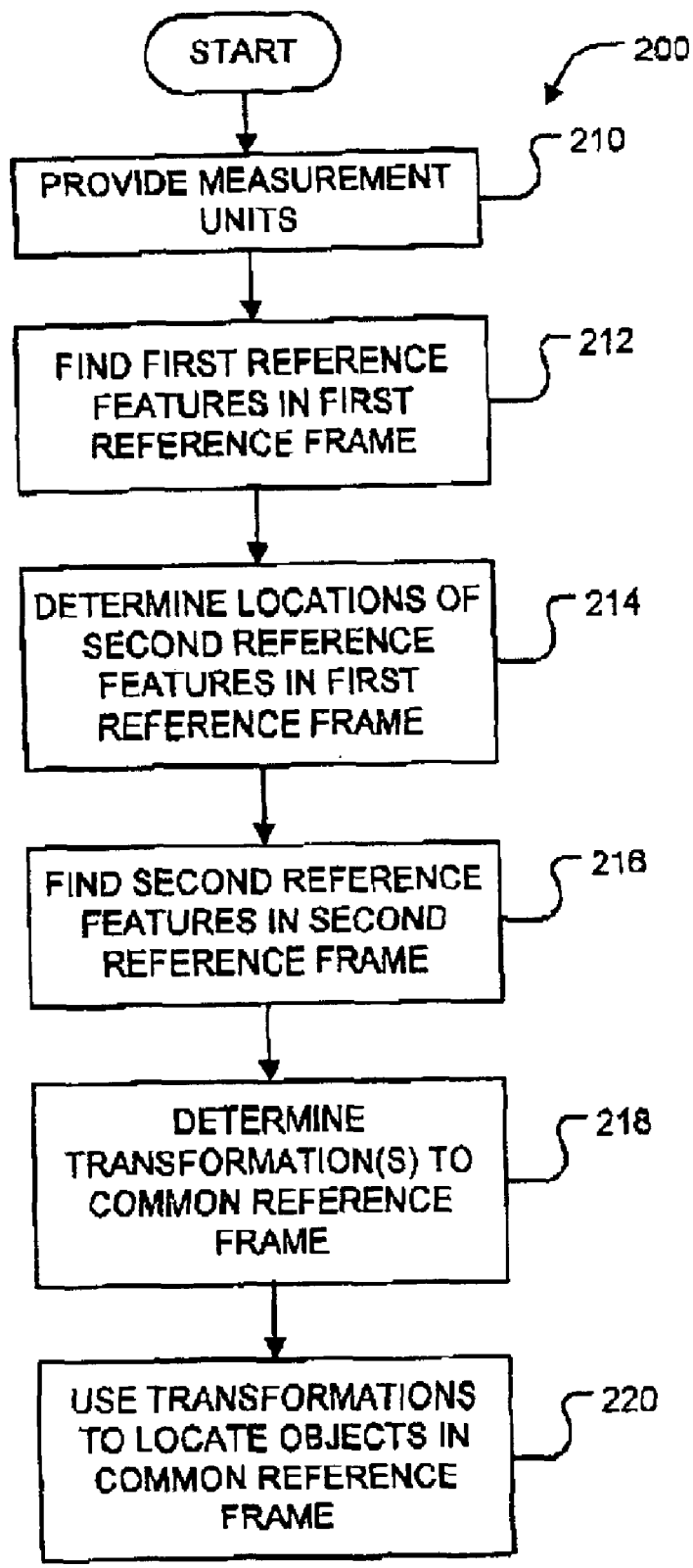

FIG. 14 shows a method 200 according the invention, Method 200 begins by providing at least two measurement units each capable of locating objects within a corresponding measurement field (block 210). Method 200 continues by obtaining information about a first set of calibration features (which may comprise points, lines, etc.) in a first reference frame local to a first measurement unit (block 212). The first set of calibration features is located in a measurement field of the first measurement unit The information obtained in block 212 is used in block 214 to determine locations of a second set of calibration features relative to the first reference frame. The second set of calibration features are located in the measurement field of a second measurement unit. In block 216 locations of the second set of calibration features relative to the second reference frame is determined. In block 218 the locations of the second set of calibration features relative to the first and second reference frames are used to establish a set of one or more transformations from the local reference frames to a common reference frame. In block 120 the transformations are used to express the locations of reference points (which may be in either measurement field) relative to the common reference frame.

In the foregoing description, image processing steps which are common and well known to those skilled in the art have been omitted for clarity. For example, the method of the invention may involve processing raw data to correct for image distortions introduced by camera lenses. Such image processing techniques are known to those skilled in the field of image processing. Computer software which implements such techniques is available commercially from Point Grey Research Inc., of Vancouver Canada.

Certain implementations of the invention comprise computer processors which execute software instructions which cause the processors to perform a method of the invention. The invention may also be provided in the form of a program product. The program product may comprise any medium which cries a set of computer-readable signals comprising instructions which, when executed by a data processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the at in the light of the foregoing disclosure, many alterations and modifications are possible in the practice of this invention without departing from the spirit or scope thereof. For example:

stereo measurement units may comprise any device capable of locating objects in space including: monocular vision systems capable of determining a location of the monocular vision system in three dimensions by determining a pose and location of a known calibration object relative to the monocular vision system, laser rangefinders, stereo cameras, and the like;

Processor 14 or 90 may comprise a programmed computer processor executing software instructions, a hardware processor or a combination of hardware and software;

it is a matter of design convenience whether, after the system is calibrated, the positions of points are first determined in local coordinate systems of individual stereo measurement units to produce localized three-dimensional data 82 and then converted in data integration process 32 to a common coordinate system (i.e. the embodiment of FIG. 12) or whether the positions of the points in the common coordinate system are determined in data integration process 32 directly from raw image data 80 from individual imaging devices (i.e. embodiment of FIG. 3).

Accordingly, the scope of the invention is to be construed in accordance with the substance defined by the following claims.

What is claimed is:

1. A method for calibrating a three-dimensional imaging system the method comprising:

providing first and second measurement units, the first measurement unit configured to acquire information from which locations of object features within a first measurement field can be determined in a first local coordinate system, the second measurement unit configured to acquire information from which locations of object features within a second measurement field can be determined in a second local coordinate system;

determining first locations in the first local coordinate system of a first plurality of calibration features located in the first measurement field, and, based on the first locations, determining locations in the first local coordinate system of a second plurality of calibration features located in the second measurement field;

determining locations of the second plurality of features in the second local coordinate system; and, deriving a transformation between the local coordinate systems and a common coordinate system based upon the locations of the second plurality of calibration features in the first and second local coordinate systems.

2. The method of claim 1 wherein the first and second measurement fields overlap within an overlap region and the first and second pluralities of calibration features are located within the overlap region.

3. The method of claim 2 wherein the first and second pluralities of calibration features each comprise the same calibration features.

4. The method of claim 1 wherein the first and second pluralities of calibration features are rigidly connected to one another.

5. The method of claim 1 wherein determining the locations in the first local coordinate system of the second plurality of calibration features comprises determining locations of each of the first and second pluralities of calibration features relative to one another using one or more additional measurement units having measurement fields overlapping with the first and second measurement fields.

6. A method for calibrating a three-dimensional imaging system the method comprising:

providing first and second measurement units, the first measurement unit configured to determine locations of object features within a first measurement field in a first local coordinate system, the second measurement unit configured to determine locations of object features within a second measurement field in a second local coordinate system, the first and second measurement fields overlapping within an overlap region;

determining locations of a plurality of calibration features located in the overlap region in each of the first and second local coordinate systems;

deriving a transformation between the local coordinate systems and a common coordinate system based upon the locations of the plurality of calibration features.

7. The method of claim 6 wherein the common coordinate system is the same as one of the first and second local coordinate systems.

8. The method of claim 6 wherein deriving a transformation between the local coordinate systems and a common coordinate system to comprises performing an iterative process.

9. The method of claim 8 wherein the iterative process comprises:

obtaining an estimated transformation, applying the estimated transformation to the locations of the plurality of calibration features, determining an error in the estimated transformation, determining a correction based on the error, and applying the correction to the estimated transformation.

10. The method of claim 9 wherein the iterative process comprises performing steps in a least-squares algorithm.

11. The method of claim 9 wherein the iterative process comprises applying different weightings to different calibration features.

12. The method of claim 8 wherein the iterative process comprises:

obtaining an estimated transformation;

correcting the estimated transformation;

identifying one or more redundant calibration features for which the estimated trasformations produces statistically outlying results; and, correcting the estimated transformation again without reference to the one or more redundant calibration features.

13. The method of claim 6 comprising:

providing an additional measurement unit having a measurement field overlapping with one of the first and second measurement fields in an additional overlap region, the additional measurement unit configured to determine locations of object features within its measurement field in an additional local coordinate system;

determining locations of a plurality of calibration features located in the additional overlap region in the additional local coordinate system;

deriving a transformation between the additional local coordinate system and a common coordinate system based upon the locations of the plurality of calibration features located in the additional overlap region.

14. The method of claim 6 wherein determining locations of a plurality of calibration features comprises determining locations of a plurality of features of a known calibration object.

15. The method of claim 6 wherein determining locations of a plurality of calibration features comprises:

determining a location of a calibration feature on a calibration object;

moving the calibration object;

determining a new location of the calibration feature; and, repeating moving the calibration object and determining a new location of the calibration feature until a desired number of new locations has been determined.

16. The method of claim 6 comprising determining in the common coordinate system a location of a first object feature located in the first measurement field and not located in the second measurement field and a location of a second object feature located in the second measurement field and not located in the first measurement field.

17. The method of claim 6 wherein the calibration features comprise a feature of a calibration target comprising a spherical object.

18. The method of claim 17 wherein determining locations of a plurality of calibration features comprises performing a circular Hough transform on image data from a plurality of imaging devices.

19. The method of claim 6 wherein the calibration features comprise a feature of a planar calibration target.

20. The method of claim 19 wherein the planar calibration target comprises a circular figure on a contrasting background.

21. The method of claim 20 wherein determining locations of a plurality of calibration features comprises performing a circular Hough transform on image data from a plurality of imaging devices.

22. A method for calibrating a three-dimensional imaging system the method comprising:

obtaining image data from a plurality of imaging devices of a first stereo measurement unit, the imaging devices having fields of view that overlap in a first stereo measurement field;

obtaining image data from a plurality of imaging devices of a second stereo measurement unit, the imaging devices having fields of view that overlap in a second stereo measurement field, the first and second stereo measurement fields overlapping one another in an overlap region containing at least one calibration target;

determining three-dimensional characteristics of at least one calibration target relative to the first stereo measurement unit using image data obtained from the imaging devices of the first stereo measurement unit;

determining three-dimensional characteristics of at least one calibration target relative to the second stereo measurement unit using image data obtained from the imaging devices of the second stereo measurement unit; and, deriving calibration parameters from the three-dimensional characteristics of the calibration targets relative to the first and second stereo measurement units, the calibration parameters comprising information about a position and orientation of the first stereo measurement units relative to the second stereo measurement unit.

23. A method according to claim 22 comprising deriving transformation functions based on the calibration parameters, the transformation functions providing a relationship between position data obtained from a pair of the imaging devices and a common coordinate system.

24. A method according to claim 23, wherein determining the three-dimensional characteristics of at least one calibration target comprises determining three-dimensional characteristics of a plurality of calibration features.

25. A method according to claim 23, wherein determining the three-dimensional characteristics of at least one calibration target comprises determining three-dimensional characteristics of at least one of: circles, spheres, lines, and corners of a calibration object.

26. A method according to claim 23, comprising measuring three-dimensional characteristics of an object located in any of the first stereo measurement field and the second stereo measurement field using the calibration parameters and using image data obtained from at least two imaging devices selected from: the imaging devices of the first stereo measurement unit and the imaging devices of the second stereo measurement unit.

27. A method according to claim 23, comprising:

obtaining image data from a plurality of imaging devices of each of one or more additional stereo measurement units, the imaging devices of each additional stereo measurement unit having fields of view that overlap one another in additional stereo measurement fields, at least one of the additional stereo measurement fields connected to at least one of the first and second stereo measurement fields by overlapping regions; and, deriving, from the image data obtained from the plurality of imaging devices of the additional stereo measurement units, calibration parameters comprising information about a position and orientation of each additional stereo measurement unit relative to a common coordinate system.

28. A method according to claim 24, wherein deriving each transformation function comprises starting with an estimated transformation function and then iteratively optimizing the transformation function to reduce differences between the three-dimensional characteristics of calibration targets in transformed image data and three-dimensional characteristics of the calibration targets in the common coordinate system.

29. A method according to claim 28, wherein optimizing the transformation function comprises selectively weighing three-dimensional characteristics of some of the one or more calibration targets.

30. Apparatus for determining the locations of object features in three dimensions, the apparatus comprising:

a first measurement unit configured to generate first data from which locations of object features in a first measurement field can be determined in a first local coordinate system;

a second measurement unit configured to generate second data from which locations of object features in a second measurement field can be determined in a second local coordinate system; and, a processor configured to:
receive the first and second data;
extract from the first data information about a first plurality of calibration features in the first measurement field; and,
based on the calibration information, determine locations in the first local coordinate system of a second plurality of calibration features in the second measurement field;
determine from the second data locations of the second plurality of calibration features in the second local coordinate system; and, based on the locations of the second plurality of calibration features in the first and second local coordinate systems, generate a transformation which, when applied to the second data, expresses locations of object features in a common coordinate system.

31. The apparatus of claim 30 wherein the first and second measurement fields overlap in an overlap region and the second plurality of calibration features is in the overlap region.

32. The apparatus of claim 30 wherein the first and second pluralities of calibration features each comprise the same calibration features.

33. Apparatus for determining the locations of object features in three dimensions, the apparatus comprising:

a first measurement unit configured to generate first data from which locations of object features in a first measurement field can be determined in a first local coordinate system;

a second measurement unit configured to generate second data from which locations of object features in a second measurement field can be determined in a second local coordinate system, the second measurement unit located so that the first and second measurement fields overlap in an overlap region; and, a processor configured to:
receive the first and second data;
extract from each of the first and second data calibration information about a plurality of calibration features of one or more calibration objects located in the overlap region; and,
based on the calibration information, generate a transformation which, when applied to the second data expresses locations of object features in a common coordinate system.

34. The apparatus of claim 33 wherein the first and second measurement fields have substantially parallel axes of symmetry.

35. The apparatus of claim 33 wherein the first and second measurement fields cross one another at an angle.

36. The apparatus of claim 33 wherein each of the measurement units comprises two or more spaced-apart imaging devices and the imaging devices of each of the measurement units have fields of view which overlap with one another in the corresponding measurement field.

37. The apparatus of claim 36 wherein each of the imaging devices has an optical axis and the optical axes of the plurality of imaging devices are substantially parallel to one another.

38. The apparatus of claim 33 wherein the processor is configured to perform a model-based recognition algorithm on the first and second data.

39. The apparatus of claim 33 wherein the processor is configured to perform a circular Hough transform on the first and second data to locate features of circular calibration targets.

40. The apparatus of claim 33 comprising a plurality of additional measurement units having corresponding additional measurement fields each connected to at least one of: the first measurement field, the second measurement field and another additional measurement field, by way of one or more overlapping regions.

41. Apparatus for determining the locations of object features in three dimensions, the apparatus comprising:
   a first stereo measurement unit comprising a plurality of imaging devices, the imaging devices having fields of view that overlap in a first stereo measurement field;
   a second stereo measurement unit comprising a plurality of imaging devices, the imaging devices having fields of view that overlap in a second stereo measurement field, the first and second stereo measurement fields overlapping one another in an overlap region; and,
   a processor, configured to:
      receive image data from individual imaging devices in the fist and second stereo measurement units;
      derive calibration parameters related to relative positions and orientations of the first and second stereo measurement units, such that image data received from the first and second stereo vision units may be transformed to a common reference coordinate system, using the calibration parameters, and,
      locate features of objects in the first or second stereo measurement field in a common coordinate system using the image data and the calibration parameters.

42. An apparatus according to claim 41, wherein the imaging devices comprise at least one of: digital cameras, analog cameras, acoustic sensors and laser range finders.

43. An apparatus according to claim 41, wherein the processor is one of: a computer executing a program; an embedded processor that is part of at least one of the first and second stereo measurement units and that is configured to execute instructions contained in memory accessible to the embedded processor; and a detachable processor that is attachable to, and detachable from, the first and second stereo measurement units and that is configured to execute instructions contained in memory accessible to the detachable processor.

44. An apparatus for determining locations of object features, the apparatus comprising:
   means for obtaining first data representing locations of object features in a first measurement field in a first local coordinate system;
   means for obtaining second data representing locations of object features in a second measurement field in a second local coordinate system;
   means for locating in the first data a first plurality of calibration features in the first measurement field and determining based on the first plurality of calibration features, locations of a second plurality of calibration features in the second measurement field;
   means for locating in the second data the plurality of calibration features;
   means for determining calibration parameters based on the calibration features located in the first and second data; and,
   means for locating object features relative to a common coordinate system using the calibration parameters.

45. The apparatus of claim 44 wherein the first and second measurement fields overlap in an overlap region.

46. The apparatus of claim 44 wherein the means for determining calibration parameters comprises a means for deriving one or more transformation functions from the first and second data.

47. The apparatus of clam 45 wherein the transformation functions are adapted to provide as outputs the locations of object features in a common coordinate system when the transformation functions are used in processing the first data or the second data or both the first and second data.

48. An apparatus according to claim 46 wherein the first data comprises image data from two or more imaging devices and the apparatus comprises means for locating object features in the image data from each of two or more imaging devices and determining a position of the object features by triangulation.

49. An apparatus according to claim 44 wherein the first and second data respectively comprise coordinates in the first and second local coordinate systems of points in a point cloud.

50. Processing apparatus for use in determining locations of object features detected by one of a plurality of measurement in units, the processing apparatus comprising:
   an input for receiving first data from which locations of object features in a first measurement field can be determined in a first local coordinate system and second data from which locations of object features in a second measurement field can be determined in a second local coordinate system, the first and second measurement fields overlapping in an overlap region; and,
   a processor configured to:
      extract from each of the first and second data calibration information about a plurality of calibration features of one or more calibration objects located in the overlap region; and,
      based on the calibration information, generate a transformation which, when applied to the second data expresses locations of object features in a common coordinate system.

51. A machine readable medium carrying a set of instructions which, when executed by a data processor cause the data processor to perform a method for calibrating a three-dimensional imaging system, comprising;
   receiving first image data from a plurality of first imaging devices of a first measurement unit, the first imaging devices having fields of view that overlap in a first measurement field and second image data from a plurality of second imaging devices of a second measurement unit, the second imaging devices having fields of view that overlap in a second measurement field, the first and second stereo measurement fields overlapping one another in an overlap region;
   locating a plurality of calibration features in each of the first and second image data;
   determining, from the locations in the first and second data of the calibration features, information characterizing a position and orientation of the second stereo measurement unit relative to the first stereo measurement unit.

52. A method of calibrating a three-dimensional imaging system comprising a plurality of measurement units each having a local coordinate system, the method comprising:

a step for acquiring locations of a plurality of calibration features in a first local coordinate system of a first measurement unit;

a step for acquiring locations of the plurality of calibration features in each of one or more additional local coordinate systems; and, a step for creating a transformation from one or more of the local coordinate systems to a common coordinate system based on the locations of the plurality of calibration features in the first local coordinate system and the locations of the plurality of calibration features in at least one of the one or more additional local coordinate systems.

53. A method for calibrating a three-dimensional imaging system comprising:

providing first and second measurement units, the first measurement unit configured to determine locations in a first local coordinate system of object features within a first measurement field, the second measurement unit configured to determine in a second local coordinate system locations of object features within a second measurement field;

determining locations of a first plurality of calibration features in the first local coordinate system, the first plurality of calibration features located in the first measurement field;

determining locations of a second plurality of calibration features in the second local coordinate system the second plurality of calibration features located in the second measurement field, first plurality of features having a fixed location relative to the second plurality of features; and, deriving a transformation between the local coordinate systems and a common coordinate system based upon the locations of the first and second pluralities of calibration features.

54. A method according to claim 53, wherein said first and second stereo measurement fields overlap within an overlap region and the first and second pluralities of features are located in the overlap region.

55. A method according to claim 54, wherein determining locations of a first plurality of calibration features in the first local coordinate system also determines the locations of the second plurality of calibration features in the first local coordinate system.

* * * * *